US010243839B2

(12) United States Patent
Edge et al.

(10) Patent No.: US 10,243,839 B2
(45) Date of Patent: Mar. 26, 2019

(54) SYSTEM AND METHOD FOR SELECTION OF AN EVOLVED PACKET DATA GATEWAY FOR WIRELESS LOCAL AREA NETWORK ACCESS TO AN EVOLVED PACKET SYSTEM

(71) Applicant: QUALCOMM Incorporated, San Diego, CA (US)

(72) Inventors: Stephen William Edge, Escondido, CA (US); Stefano Faccin, San Ysidro, CA (US); Suli Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 15/201,572

(22) Filed: Jul. 4, 2016

(65) Prior Publication Data
US 2017/0005914 A1 Jan. 5, 2017

Related U.S. Application Data

(60) Provisional application No. 62/318,713, filed on Apr. 5, 2016, provisional application No. 62/280,677, filed
(Continued)

(51) Int. Cl.
H04W 4/90 (2018.01)
H04W 8/04 (2009.01)
(Continued)

(52) U.S. Cl.
CPC .......... *H04L 45/26* (2013.01); *H04L 45/745* (2013.01); *H04L 61/1511* (2013.01);
(Continued)

(58) Field of Classification Search
CPC ....... H04L 12/741; H04L 29/06; H04L 29/12; H04L 45/26; H04L 63/0892;
(Continued)

(56) References Cited

U.S. PATENT DOCUMENTS

2011/0261787 A1* 10/2011 Bachmann ............ H04L 63/029
370/331
2014/0162648 A1 6/2014 Cui et al.

FOREIGN PATENT DOCUMENTS

EP 1895800 A1 3/2008
WO 2011088170 A1 7/2011
(Continued)

OTHER PUBLICATIONS

Blackberry UK Ltd., et al., "Clarification on Sources of PLMN IDs", 3GPP Draft; C1-151202-24302-D10-SP,3GPP, CT WG1, no. Meeting #91, Bratislava (Slovakia); Apr. 13, 2015, XP050929619, 2 pages. Retrieved from the Internet: URL: http://www.3gpp.org/ftp/Meetings_3GPP_SYNC/CT1/Docs/ [retrieved on Apr. 12, 2015].
(Continued)

Primary Examiner — Charles C Jiang
Assistant Examiner — Kyaw Z Soe
(74) Attorney, Agent, or Firm — Arent Fox, LLP

(57) ABSTRACT

In aspects of the disclosure, a method, an apparatus, and a computer program product for wireless communication by a user equipment (UE) are provided. In one aspect, the UE associates with an access point of a wireless local area network which may be untrusted, obtains a list comprising a plurality of public land mobile network (PLMN) entries and one or more selection conditions associated with each one of the plurality of PLMN entries, and selects a PLMN from the list when the one or more selection conditions associated with the PLMN are satisfied. The UE may further discover an evolved packet data gateway (ePDG) for the selected PLMN using one or more fully qualified domain name (FQDN) rules for the selected PLMN. The UE may then attach to the selected PLMN using the discovered ePDG.

47 Claims, 6 Drawing Sheets

Related U.S. Application Data on Jan. 19, 2016, provisional application No. 62/188,692, filed on Jul. 5, 2015.

(51) Int. Cl.

| | |
|---|---|
| *H04W 8/08* | (2009.01) |
| *H04L 29/12* | (2006.01) |
| *H04L 29/06* | (2006.01) |
| *H04L 12/721* | (2013.01) |
| *H04L 12/741* | (2013.01) |
| *H04W 48/18* | (2009.01) |
| *H04W 80/10* | (2009.01) |
| *H04W 84/12* | (2009.01) |
| *H04W 88/06* | (2009.01) |
| *H04W 88/08* | (2009.01) |
| *H04W 88/16* | (2009.01) |

(52) U.S. Cl.
CPC ........... *H04L 63/0892* (2013.01); *H04W 4/90* (2018.02); *H04W 8/04* (2013.01); *H04W 8/082* (2013.01); *H04W 48/18* (2013.01); *H04W 80/10* (2013.01); *H04W 84/12* (2013.01); *H04W 88/06* (2013.01); *H04W 88/08* (2013.01); *H04W 88/16* (2013.01)

(58) Field of Classification Search
CPC .... H04L 45/745; H04L 61/1511; H04W 4/22; H04W 8/04; H04W 8/08; H04W 4/90; H04W 48/18; H04W 8/082; H04W 88/08; H04W 88/06; H04W 84/12; H04W 80/10
See application file for complete search history.

(56) References Cited

FOREIGN PATENT DOCUMENTS

| | | |
|---|---|---|
| WO | 2014177222 A1 | 11/2014 |
| WO | 2014191015 A1 | 12/2014 |
| WO | 2015042189 A1 | 3/2015 |
| WO | WO-2015042189 A1 * | 3/2015 ............ H04W 48/18 |

OTHER PUBLICATIONS

International Search Report and Written Opinion—PCT/US2016/040998—ISA/EPO—dated Sep. 29, 2016.

* cited by examiner

SYSTEM AND METHOD FOR SELECTION OF AN EVOLVED PACKET DATA GATEWAY FOR WIRELESS LOCAL AREA NETWORK ACCESS TO AN EVOLVED PACKET SYSTEM

CROSS-REFERENCE TO RELATED APPLICATIONS

This application claims the benefit of U.S. Provisional Application Ser. No. 62/188,692, entitled "SYSTEM AND METHOD FOR SELECTION OF AN EVOLVED PACKET DATA GATEWAY FOR WIRELESS LOCAL AREA NETWORK ACCESS TO AN EVOLVED PACKET SYSTEM" and filed on Jul. 5, 2015, which is expressly incorporated by reference herein in its entirety. In addition, this application also claims the benefit of U.S. Provisional Application Ser. No. 62/280,677, entitled "SYSTEM AND METHOD FOR SELECTION OF AN EVOLVED PACKET DATA GATEWAY FOR WIRELESS LOCAL AREA NETWORK ACCESS TO AN EVOLVED PACKET SYSTEM" and filed on Jan. 19, 2016, which is also expressly incorporated by reference herein in its entirety. Further, this application also claims the benefit of U.S. Provisional Application Ser. No. 62/318,713, entitled "SYSTEM AND METHOD FOR SELECTION OF AN EVOLVED PACKET DATA GATEWAY FOR WIRELESS LOCAL AREA NETWORK ACCESS TO AN EVOLVED PACKET SYSTEM" and filed on Apr. 5, 2016, which is also expressly incorporated by reference herein in its entirety.

BACKGROUND

Field

The present disclosure relates generally to communication systems, and more particularly, to evolved packet data gateway (ePDG) selection.

Background

A user equipment (UE) that needs wireless access in order to support communications services (e.g. such as making an emergency call) on behalf of the user of the UE and/or applications on the UE may sometimes need to access a wireless local area network (WLAN), such as defined by the IEEE 802.11x standards. This may occur when wireless cellular access is not available at the UE's location or when wireless cellular coverage is available but is not preferred (such as caused by high cellular access charges if a UE is roaming). In that case, if there is an available WLAN access point (AP) within radio range of the UE that is not considered as trusted by the UE (e.g. not belonging to a cellular network operator), the UE may need to establish communication services (e.g. establish an emergency call) by accessing a cellular network by means of the WLAN AP through a gateway entity in the cellular network known as an evolved packet data gateway (ePDG). The ePDG may provide access for the UE to other entities in the cellular network such as a packet data network (PDN) gateway and an Internet Protocol (IP) Multimedia Subsystem (IMS) through which communication services (e.g. establishing an emergency call or a non-emergency call) may be supported. Selection of a suitable ePDG by the UE and, by association, selection of the cellular network that owns the ePDG, may then be a critical part of establishing communication services, such as establishing an emergency call.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In aspects of the disclosure, a method, an apparatus, and a computer program product for wireless communication are provided. In one aspect, the apparatus associates with an access point of a wireless communication network, obtains a list comprising a plurality of public land mobile network (PLMN) entries and one or more selection conditions associated with each one of the plurality of PLMN entries, and selects a PLMN from the list when the one or more selection conditions associated with the PLMN are satisfied.

In an aspect, the one or more selection conditions may comprise at least one member selected from the group consisting of the UE being already attached to the PLMN by a Third Generation Partnership Project (3GPP) access type; the PLMN being visible at a cellular level to the UE and the UE not being attached to any other PLMN; the UE being located in the same country as the PLMN; the PLMN being a default wildcard PLMN; and the PLMN not being available for selection.

The selecting the PLMN may comprises sequentially evaluating each one of the plurality of PLMN entries in the list using the one or more selection conditions until it is determined that the one or more selection conditions are met.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
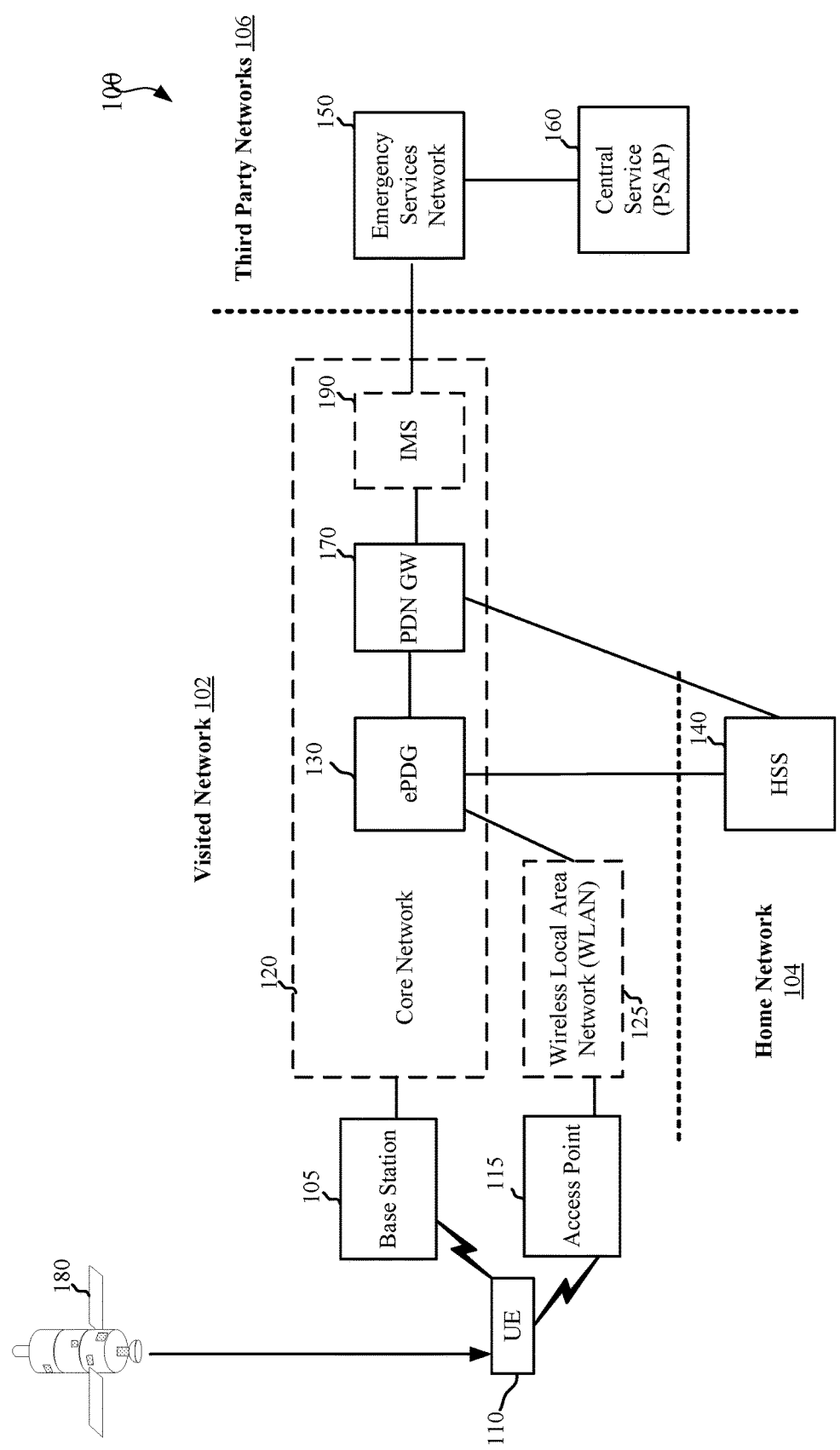
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 illustrates an example of a wireless communications system 100 for ePDG selection and access in accordance with various aspects of the present disclosure. Wireless communications system 100 may be used to support emergency services for a UE 110 over a WLAN, such as over an IEEE 802.11 WiFi AP, for example.

The wireless communications system 100 may include a visited network 102, a home network 104, and third party networks 106. The visited network 102 may also be referred to as a visited PLMN (VPLMN), a serving network, etc. The home network 104 may also be referred to as a home PLMN (HPLMN). For example, the visited network 102 may be a serving network for the UE 110 when roaming outside the wireless coverage area of the home network 104. However, the UE 110 may be located in the home network 104 when not roaming. That is, the visited network 102 and the home network 104 may be the same network if the UE 110 is not roaming.

The visited network 102 may include a base station 105, such as an evolved NodeB (eNodeB or eNB) for Long Term Evolution (LTE) cellular wireless access, which may be part of an access network (not shown). The base station 105 may connect to UE 110 via a physical layer wireless connection. The visited network 102 may also include a core network 120, which may be associated with (e.g. may include) an ePDG 130, a PDN Gateway 170, an IMS 190, and/or other network entities, not shown in FIG. 1 for simplicity. The core network 120 may be a Global System for Mobile Communications (GSM) network, a Wideband Code Division Multiple Access (WCDMA) network, a High Speed Packet Access (HSPA) network, a General Packet Radio Service (GPRS) access network, a Long Term Evolution (LTE) network, a CDMA2000 1X network, a High Rate Packet Data (HRPD) network, or an Ultra Mobile Broadband (UMB) network, etc. WCDMA, HSPA and GPRS are part of Universal Mobile Telecommunication System (UMTS). GSM, WCDMA, HSPA, GPRS, UMTS and LTE are described in documents from an organization named "3rd Generation Partnership Project" (3GPP). CDMA2000 1X and HRPD are part of cdma2000, and cdma2000 and UMB are described in documents from an organization named "3rd Generation Partnership Project 2" (3GPP2). The ePDG 130 may perform IP address assignment and IP packet routing functions for packet switched services including transfer of data and establishment of VoIP calls and may also route Short Message Service (SMS) messages. The UE 110 may also connect to an access point (AP) 115 such as an IEEE 802.11x WiFi AP, which may be part of a wireless local area network (WLAN) 125.

As noted above, the ePDG 130 may be employed for connecting UE 110 to core network 120 from an untrusted WLAN such as WLAN 125 (e.g. which may be an untrusted WiFi hotspot). The PDN Gateway (GW) 170 may provide data (e.g. IP) access between UE 110 and external entities such as the Internet (not shown in FIG. 1) and Emergency Services Network 150 and may assign an externally visible IP address to UE 110. IMS 190 may support the establishment and release of data and voice sessions and calls between UE 110 and external entities such as central service (PSAP) 160 (also referred to herein as PSAP 160) and may support the establishment and release of an emergency call for UE 110. IMS 190 may contain elements not shown in FIG. 1 such as a Proxy Call Session Control Function (P-CSCF), an Emergency Call Session Control Function (E-CSCF) and a Location Retrieval Function (LRF). Data and voice communications supported by ePDG 130 and PDN Gateway 170 may be routed to and from external entities such as Emergency Services Network 150 via the Internet and/or other routers and switches (not shown in FIG. 1) but not via IMS 190, as indicated by showing IMS 190 as a dashed box. Conversely, signaling messages (e.g. messages for the Session Initiation Protocol (SIP)) may be transferred between UE 110 and external entities (e.g. emergency services network 150 and central service (PSAP) 160) via ePDG 130 and PDN Gateway 170 by transferring these messages through IMS 190 which may intercept, modify and route the signaling messages to support the establishment and release of data and voice sessions.

The home network 104 may include one or more servers which may include a Home Subscriber Server (HSS) 140, and/or other network entities not shown in FIG. 1 for simplicity. HSS 140 may store subscription information for UEs such as UE 110 that have service subscription with the home network 104. In some cases, there may be no home network 104 if UE 110 is not subscribed to normal communications services—e.g., is restricted to making emergency calls only.

In some examples, the UE 110 may establish an emergency call and communicate with central service 160 (e.g., a Public Safety Answering Point (PSAP)) via emergency services network 150 and using signaling messages transmitted over a communication session for the emergency call. In this case, data and/or voice communication for the emergency call may be routed between UE 110 and central service 160 via access point 115, WLAN 125, ePDG 130, PDN Gateway 170 and emergency services network 150. Similarly, signaling messages (e.g. SIP messages) for the emergency call may be routed between UE 110 and central service (PSAP) 160 via access point 115, WLAN 125, ePDG 130, PDN Gateway 170, IMS 190 and emergency services network 150.

The emergency services network 150 may receive IMS emergency calls initiated by UEs served by the Visited Network 102 (e.g. UE 110) and/or the Home Network 104 and may transfer information and/or communication related to these IMS emergency calls to the central service 160. The central service 160 may be responsible for answering IMS emergency calls and may also be referred to as an Emergency Center (EC) or a public safety answering point (PSAP). The central service 160 may be operated or owned by, or on behalf of, a government agency, e.g., a county or city. In some cases, the emergency services network 150 may be a private network or private server operated by or affiliated with an automobile manufacturer. In certain examples, the emergency services network 150 may receive some or all IMS emergency calls from the UE 110 (e.g. via IMS 190) and forward data or calls to the central service 160 when appropriate.

The UE 110 may be stationary or mobile and may also be referred to as a mobile station (MS) for GSM and CDMA2000 1X, a UE for WCDMA and LTE, an access terminal (AT) for HRPD, a Secure User Plane Location (SUPL) Enabled Terminal (SET), a subscriber unit, a station, a mobile device, wireless device, etc. The UE 110 may be a device such as a cellular phone smartphone, or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The UE may also be an embedded component (e.g. a modem) in another device such as laptop or PC and/or may be an asset tag, telemetry device or wearable.

UE 110 may also include one or more devices which communicate with a PND, such as by short-range wireless, infrared, wireline connection, or other connection regardless of whether satellite signal reception, assistance data reception, and/or position-related processing occurs at the device or at the PND. Also, the UE 110 is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also included. The UE 110 may also be a dedicated In Vehicle System (IVS), which may be permanently attached to (and possibly part of) a vehicle (not shown).

As described further herein, the UE 110 may be configured to perform emergency services over WLAN. The UE 110 may then implement various mechanisms to support such emergency services. For example, when the UE 110 initiates an emergency call, the UE 110 may provide an indication or identification to the network (e.g., the visited network 102 or the home network 104) that the initiated call is an emergency call. Such an indication may allow the network to provide one or more suitable ePDGs for the UE 110 to select for establishing connectivity.

Wireless communications system 100 may further include one or more global positioning system (GPS) or Global Navigation Satellite System (GNSS) satellites 180 that may enable UE 110 to obtain the location of UE 110 (e.g. a geodetic location comprising latitude and longitude coordinates).

Figure 2:
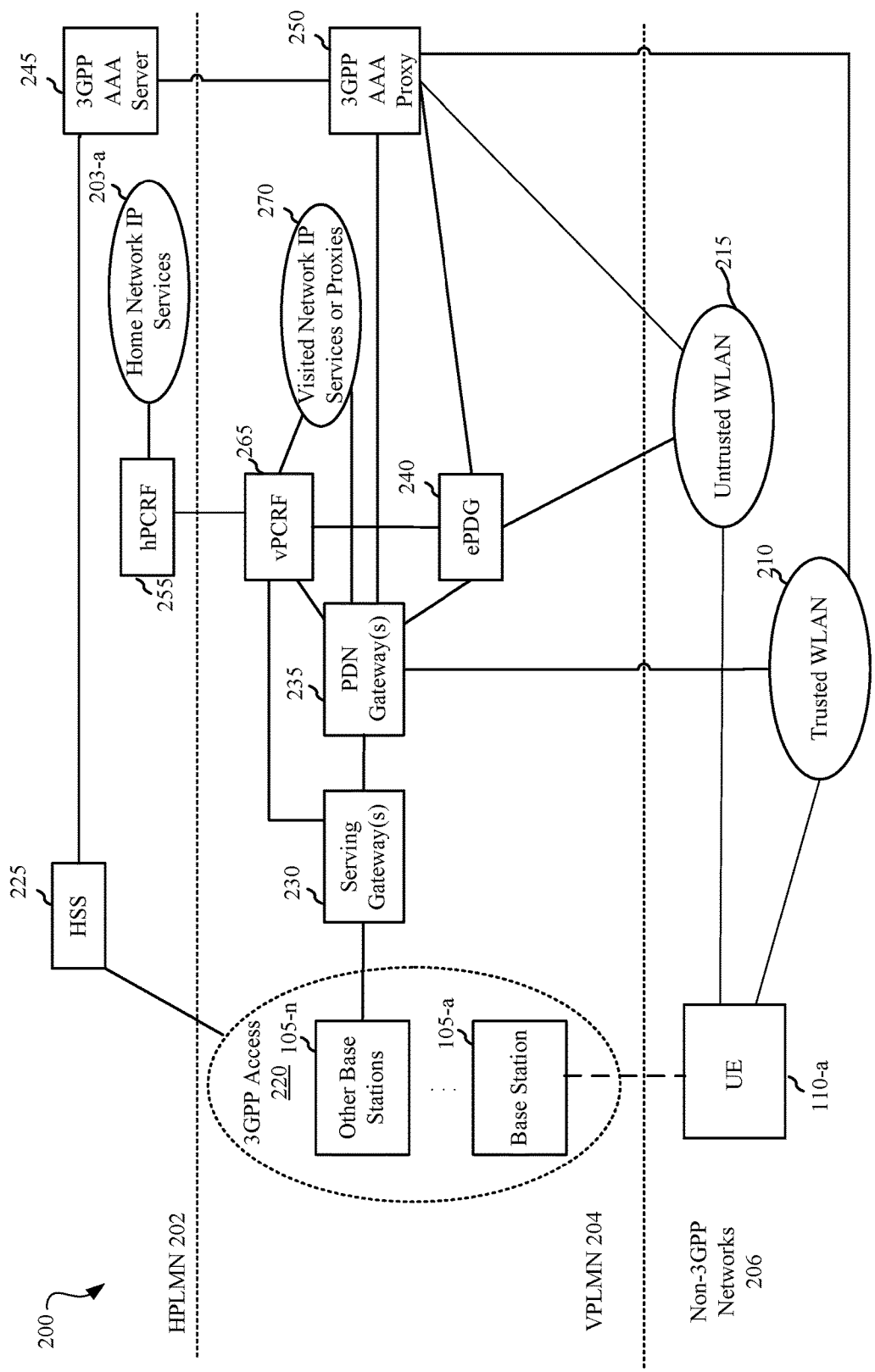
FIG. 2 is a diagram illustrating an example of a roaming architecture for selection of and attachment to an ePDG for emergency calls and non-emergency calls in an evolved packet system (EPS).

FIG. 2 illustrates an example of a wireless communications system architecture 200 for roaming, in accordance with various aspects of the disclosure. The wireless communications system architecture 200 may include an HPLMN 202 and a VPLMN 204, which may be examples of aspects of the home network 104 and the visited network 102, respectively, described with reference to FIG. 1. In this example, the HPLMN 202 and the VPLMN 204 may be part of a 3GPP network or system. The wireless communications system architecture 200 also may include non-3GPP networks 206. For example, the non-3GPP networks 206 may include a trusted WLAN 210 and an untrusted WLAN 215. The WLANs 210 and 215 may be WiFi access points and may each correspond to aspects of access point 115 and/or WLAN 125 in FIG. 1. For example, FIG. 2 illustrates an example of a roaming architecture for selection and attachment to VPLMN 204 for emergency calls and non-emergency calls in which a PDN gateway 235 is located in the VPLMN 204. In some embodiments, trusted WLAN 210 and/or untrusted WLAN 215 may correspond to other types of network such as a Bluetooth®, ZigBee or WiMax network. It is noted that while FIG. 2 shows UE 110-a as being associated only with non-3GPP networks 206, such association is not intended and UE 110-a may support communication with any of HPLMN 202, VPLMN 204, trusted WLAN 210 and untrusted WLAN 215.

In FIG. 2: the entities shown as part of VPLMN 204 except for 3GPP access 220 may correspond to or comprise part of core network 120 in FIG. 1 and/or may comprise an evolved packet core (EPC) for VPLMN 204; PDN Gateway 235 may correspond to PDN Gateway 170 in FIG. 1; ePDG 240 may correspond to ePDG 130 in FIG. 1; Visited Network IP Services or Proxies 270 may correspond to or include IMS 190 in FIG. 1; HSS 225 may correspond to HSS 140 in FIG. 1; and emergency services network 150 and central service 160, though not shown in FIG. 2, may be accessed (e.g. by UE 110-a) from PDN Gateway 235 and/or from Visited Network IP Services or Proxies 270. In addition, one or both of VPLMN 204 and HPLMN 202 may correspond to a 3GPP Evolved Packet System (EPS).

A UE 110-a, which may include example aspects of the UE 110 described with reference to FIG. 1, may be located in the cellular coverage area of the HPLMN 202, the VPLMN 204 or neither PLMN. When located in the coverage area of VPLMN 204, the UE 110-a may establish connectivity with VPLMN 204 and HPLMN 202 via one or more base stations 105-a through 105-n of VPLMN 204, which may correspond to aspects of base station 105 in FIG.

1. The base stations 105-*a* through 105-*n* may be part of a 3GPP access 220 for VPLMN 204—e.g. the 3GPP access 220 may be an evolved UMTS Terrestrial Radio Access Network (E-UTRAN) for VPLMN 204 that supports LTE wireless access. The UE 110-*a* may communicate with an HSS 225 of the HPLMN 202 and/or a serving gateway 230 of the VPLMN 204 via the 3GPP access 220.

The UE 110-*a* may establish connectivity with the VPLMN 204 and possibly HPLMN 202 via the trusted WLAN 210 and a PDN gateway 235. With a trusted WLAN 210 (e.g. a trusted WiFi AP) the operator of VPLMN 204 may own or have a business relationship with the operator of trusted WLAN 210 which may enable direct access from the trusted WLAN 210 to the EPC of VPLMN 204. In the case of untrusted WLAN 215, there may be no relationship (e.g. no business relationship) between the untrusted WLAN 215 (e.g. a WiFi AP) and the operator of VPLMN 204 and access to the EPC of VPLMN 204 may need to go through ePDG 240 which may function as an additional gateway entity and may enable a secure connection.

The HSS 225 may communicate with a 3GPP Authentication Authorization Accounting (AAA) server 245, for authenticating the UE 110-*a*, verifying the authorization of the UE 110-*a* (e.g. to access VPLMN 204) and accounting for services (e.g., talk time, data usage, etc.) accessed by the UE 110-*a*. Similarly, the PDN gateway 235 and the ePDG 240 may communicate with a 3GPP AAA proxy 250 in the VPLMN 204, which may be in communication with the 3GPP AAA server 245 in the HPLMN 202.

The HPLMN 202 may include a home policy and charging rules function (hPCRF) 255 that, among other known operations, may control access to home network IP services 203-*a*. Similarly, the VPLMN 204 may include a visited policy and charging rules function (vPCRF) 265 (illustrated with connections to the serving gateway 230, the PDN gateway 235, and the ePDG 240) that may control access to visited home network IP services or proxies 270.

When an emergency call is initiated by the UE 110-*a* over the untrusted WLAN 215 (e.g., a public WiFi hotspot), the connectivity may be established via the ePDG 240 as illustrated. As discussed above, selection of a suitable or appropriate ePDG may be important for the emergency call. Similarly, when the UE 110-*a* needs to access or initiate non-emergency services (such as establishing a voice call or data session with some external entity, not shown in FIG. 2), over the untrusted WLAN 215, the connectivity may also be established via the ePDG 240 as illustrated. As discussed previously, selection of a suitable or appropriate ePDG may also be important for the non-emergency services.

It may be appreciated by those with knowledge of the art that while FIG. 2 illustrates access via an untrusted WLAN 215 (e.g. a WiFi AP) to a VPLMN 204 that differs from HPLMN 202 (e.g. when UE 110-*a* is roaming out of coverage of HPLMN 202), similar access by UE 110-*a* via an untrusted WLAN 215 to HPLMN 202 is possible with small changes to the architecture shown in FIG. 2. For example, PDN Gateway 235 can be located in HPLMN 202 rather than VPLMN 204 to enable UE 110-*a* access to HPLMN 202 via VPLMN 204. Alternatively, all the elements shown as being part of VPLMN 204 in FIG. 2 may belong to HPLMN 202 in the case that VPLMN 204 is HPLMN 202. In that case, hPCRF 255 and vPCRF 265 may be the same policy and charging rules function (PCRF); 3GPP AAA server 245 and 3GPP AAA proxy 250 may be the same AAA server; and home network IP services 203-*a* and Visited network IP services or proxies 270 may be the same.

The UE 110-*a* (e.g., a mobile device) connected to a WLAN, such as untrusted WLAN 215, may gain IP connectivity and additional services (e.g. IMS supported services) via the EPC for VPLMN 204. The PDN gateway 235 may be the IP anchor for UE 110-*a* in VPLMN 204 that provides access to VPLMN 204 services (e.g. IMS services) and to other entities (e.g. a PSAP such as PSAP 160). The WLAN to which the UE 110-*a* connects may be a trusted WLAN 210 or an untrusted WLAN 215. If the WLAN is untrusted (e.g. is untrusted WLAN 215), the UE 110-*a* may need to connect to an ePDG 240 before gaining access to the PDN gateway 235. The connection (also referred to as an interface) between the ePDG 240 and the PDN gateway 235, in the case of untrusted WLAN access, is referred to as the S2b connection or S2b interface in 3GPP Technical Specification (TS) 23.402. Once the UE 110-*a* selects an ePDG 240 using ePDG selection procedures, the UE 110-*a* may set up a secure connection (e.g. an IPsec tunnel) to the ePDG 240 for secure connection to the EPC of VPLMN 204. In an aspect, assistance information for ePDG selection may be pre-configured in the UE 110-*a*. For example, the home (HPLMN 202) operator for UE 110-*a* may pre-configure a list that includes one or more PLMN entries, one or more selection conditions associated with each PLMN entry, one or more PLMN identifiers (IDs) (e.g., mobile country code (MCC) and/or mobile network code (MNC)) associated with each PLMN entry, and/or one or more fully qualified domain name (FQDN) rules for use by the UE 110-*a* in selecting and connecting to an ePDG in a specific network. For WLAN access to VPLMN 204 using the S2b interface, the UE 110-*a* may need to first access an ePDG 240 associated with the VPLMN 204 via the WLAN. If the UE 110-*a* knows the VPLMN 204 identity in terms of an MCC ID plus MNC ID, a fully qualified domain name (FQDN) for the ePDG 240 may be constructed by the UE 110-*a* using the MCC ID plus MNC ID. Rules for constructing the FQDN for an ePDG 240 using the MCC and MNC IDs for a VPLMN 204 (or HPLMN 202) are defined by 3GPP in 3GPP TS 23.003. The UE 110-*a* may then obtain the IP address for the ePDG 240 using the FQDN so constructed in a domain name server (DNS) query. The UE 110-*a* may then access the VPLMN 204 EPC. Additionally and/or alternatively, a VPLMN 204 operator may use a different FQDN for some or all of its ePDGs 240: in this case, the UE 110-*a* may obtain the FQDN for an ePDG if this was configured in the UE 110-*a* in association with the particular VPLMN 204 (e.g. in association with the MCC and MNC for the VPLMN 204).

In an example embodiment, when the UE 110-*a* attempts to construct an FQDN for selecting an ePDG 240 in a certain PLMN X (e.g., which may be either the VPLMN 204 or the HPLMN 202), then the UE 110-*a* may construct one of the following two FQDN formats. In a first FQDN format, an FQDN may include an operator identifier FQDN. The UE 110-*a* may construct this first FQDN format by using the PLMN X MCC and MNC IDs as the Operator Identifier as previously described. Alternatively, in a second FQDN format, the FQDN may include a tracking/location area identity FQDN. The UE 110-*a* may construct the second FQDN format by using the identity of the tracking area/location area in which it is located which may include the MCC ID and MNC ID for the PLMN X and a tracking area ID corresponding to the tracking area in which the UE 110-*a* is located. The tracking/location area identity FQDN may be used to support location-specific ePDG selection within a PLMN.

In addition, the UE 110-*a* may select the second FQDN format if the UE 110-*a* attempts to select an ePDG 240 for a PLMN in which the UE is registered (e.g. attached via LTE access), and the UE 110-*a* is configured to use for this PLMN the Tracking/Location Area Identity FQDN, and the UE 110-*a* knows the tracking area identity (TAI) or location area identity (LAI) of the area in which the UE 110-*a* is located. Otherwise the UE 110-*a* may construct the Operator Identifier FQDN. Additionally or alternatively, the UE 110-*a* may construct the Operator Identifier FQDN as a fallback in the case of failure of DNS resolution of a Tracking/Location Area Identity based FQDN.

Conventional ePDG selection by the UE 110-*a* for untrusted WLAN access to a PLMN is based on access to an ePDG 240 for a VPLMN 204 to which the UE is already attached via cellular access or to an ePDG 240 for the HPLMN 202. Conventional ePDG selection may be deficient for at least two reasons. First, when using WLAN access for an emergency call, a UE 110-*a* may need to access a PLMN in the same country as the UE 110-*a*, in order to have the emergency call routed to a local public safety answering point (PSAP) by this PLMN. If the UE 110-*a* accesses the HPLMN and is roaming in another country, the HPLMN may not normally be able to route the call to a PSAP in the country in which the UE 110-*a* is roaming and the emergency call may fail. Thus, the concept of accessing the HPLMN 202, when the UE 110-*a* is not already attached to a VPLMN 204 in the country in which the UE 110-*a* is roaming, may not typically lead to a successful emergency call to the correct PSAP for the current UE location. In addition to this, even when a UE 110-*a* uses a WLAN to access a PLMN in the same country as the UE 110-*a* (e.g., the HPLMN 202 when the UE 110-*a* is in the home country or the VPLMN 204 when the UE 110-*a* is not in the home country), the PLMN that is accessed may not provide cellular coverage at the location of the UE 110-*a* (e.g. may not be licensed to provide cellular coverage at this location) and, as a consequence, may not be able to route an emergency call to a local PSAP serving the location of the UE 110-*a*.

The second reason that conventional ePDG selection may be deficient concerns the ability of the UE 110-*a* to access a preferred PLMN. Typically, the operator of an HPLMN 202 may prefer that a UE 110-*a* accesses the HPLMN 202 whenever coverage is available from the HPLMN 202 and, when coverage is not available, may prefer that the UE 110-*a* access a preferred PLMN (e.g. a roaming partner of HPLMN 202) for which coverage is available. In the case of WLAN access, a UE 110-*a* may be able to access a preferred PLMN even when cellular coverage from the preferred PLMN is not available at the location of the UE 110-*a*. This means that if a UE 110-*a* has cellular access from a VPLMN 204, it may be preferred by the operator of the HPLMN 202 that the UE 110-*a* access a different PLMN Y (e.g., such as the HPLMN 202 or a preferred roaming partner) than the VPLMN 204 the UE 110-*a* is currently attached to for cellular access. The reason for preferring a different PLMN Y may be that (i) access charges to the UE 110-*a* subscriber may be lower from PLMN Y than from VPLMN 204, (ii) service may be better (e.g. with better performance and/or more features and capabilities available) from PLMN Y than from VPLMN 204, and/or (iii) the UE 110-*a* subscriber may have a subscription agreement with the operator of HPLMN 202 that requires access to a preferred PLMN such as PLMN Y whenever possible.

As an example, a UE 110-*a* subscriber may have an untrusted WLAN 215 installed at home or at a work location that provides Internet access via an Internet service provider (ISP). Whenever the UE 110-*a* is in coverage of the WLAN 215 at home or at a work location, the UE 110-*a* subscriber and/or operator of the HPLMN 202 may prefer that the UE 110-*a* access a preferred PLMN via the WLAN 215. If the preferred PLMN does not provide cellular coverage to the UE 110-*a* at the location of the WLAN 215, the UE 110-*a* may not be able to attach to the preferred PLMN via cellular access. Thus, a handover from WLAN 215 access to cellular access for the preferred PLMN may not be possible. Even though lower reliability (e.g., higher incidence of call and data session failure) may then occur, the user of the UE 110-*a* and/or the operator of HPLMN 202 may still prefer the UE 110-*a* to access the preferred PLMN via the WLAN 215. Accessing the preferred PLMN via the WLAN 215 may not be supported by conventional ePDG selection because the UE 110-*a* may need to base selection of an ePDG 240 for WLAN 215 access either on the HPLMN 202 or on the VPLMN 204 to which the UE is already attached via cellular access.

The present disclosure overcomes the deficiencies of conventional ePDG selection by supporting emergency calls in any country and enabling preferential access by a UE 110-*a* (for either emergency calls or non-emergency services) to any PLMN when roaming, even when the PLMN does not provide cellular access at the current UE location.

In an example embodiment, the UE 110-*a* may be configured by the HPLMN 202 operator with an ePDG identifier configuration that contains the FQDN or IP address of an ePDG in the HPLMN. Here, the ePDG identifier configuration may include a different format than the first FQDN format and/or the second FQDN format discussed previously. Furthermore, the ePDG identifier configuration may also indicate if selection of an ePDG in a PLMN should be based on a Tracking/Location Area Identity FQDN or on an Operator Identifier FQDN.

Additionally and/or alternatively, the ePDG identifier configuration may include a prioritized list of PLMN identities (also referred to herein as a "list", a "prioritized list", a "prioritized list of PLMNs" or as "ePDG selection information") that are preferred for ePDG selection. In an aspect, the prioritized list of PLMNs may include the HPLMN 202. The ePDG selection information may further indicate whether or not each PLMN in the list supports emergency bearer services over WLAN and whether or not support of emergency bearer services over WLAN (if supported by a PLMN) is for the entire country in which the PLMN is located. In addition, the PLMNs included in the list (i.e. in the ePDG selection information) may be PLMNs that have roaming agreements with HPLMN 202 for interworking with untrusted WLANs. The ePDG selection information may include an "any PLMN" entry, which matches any PLMN the UE 110-*a* is attached to except the HPLMN 202. If the ePDG selection information contains both the "any PLMN" entry and a PLMN the UE 110-*a* is currently attached to, the UE 110-*a* may give precedence to the PLMN to which the UE 110-*a* is currently attached. The "any PLMN" entry may not indicate that emergency bearer services over WLAN are supported since this condition may not be supported by all PLMNs.

In an aspect, the PLMN identities in the list may be in the form of MCC and/or MNC codes for each PLMN, where a distinct PLMN identity is associated with each PLMN entry in the list. The list may be (though need not be) similar to or the same as another list containing PLMN identities that is used to select a PLMN for cellular access by a UE 110-*a*— e.g., with some additional data added to this list to support PLMN selection for WLAN access. The list may be configured on a universal subscriber identity module (USIM) card for the UE.

For each PLMN entry in the list, the PLMN identity in the form of an MCC and MNC ID may be included. Additionally, for each PLMN in the list, an FQDN of an ePDG may be configured in the list that belongs to this PLMN and that may be accessed by the UE 110-a to attach to this PLMN. If an FQDN is not configured for any PLMN in the list, a UE 110-a may assume by default that the FQDN for this PLMN may be constructed using the MCC and/or MNC for the PLMN (e.g. as for the operator identifier FQDN described previously and via the rules defined in 3GPP TS 23.003). In addition, for each PLMN entry in the list, a selection condition (also referred to herein as a condition) may be defined for emergency calls and optionally a similar but separate selection condition may be defined for all other services (e.g., non-emergency calls). The selection condition, if configured, may be one of the conditions shown in Table 1.

TABLE 1

| Condition | Selection Condition |
| --- | --- |
| C1 | Select the PLMN if the UE 110-a is already attached to the PLMN for cellular access or if the PLMN is visible at a cellular level and the UE 110-a has no cellular attachment to any other PLMN. |
| C2 | Select the PLMN if the UE 110-a may verify being in the same country as the PLMN. |
| C3 | Select the PLMN without any conditions (default, wildcard). |
| C4 | Do not select the PLMN. |

Other selection conditions that may be used are shown in Table 1A. The selection conditions in Table 1A may be used in addition to the selection conditions in Table 1 or instead of the selection conditions in Table 1. Furthermore, a subset of the selection conditions in Table 1 and/or Table 1A may be used in some embodiments.

TABLE 1A

| Condition | Selection Condition |
| --- | --- |
| C5 | Select the PLMN if the UE 110-a is already attached to the PLMN by a 3GPP access type (e.g. LTE, UMTS or GSM). |
| C6 | Select the PLMN if the PLMN is visible at a cellular level to the UE 110-a, provided the UE 110-a has no cellular attachment to any other PLMN. |
| C7 | Select the PLMN if the PLMN is visible at a cellular level to the UE 110-a. |
| C8 | Select the PLMN if the UE 110a can verify being in an area where the PLMN has a license for cellular wireless operation. |
| C9 | Select the PLMN if the PLMN was recently visible to the UE 110-a at a cellular level (e.g. visible within the last hour). |

Two selection conditions, as shown in Table 1 and/or Table 1A, may be included for each PLMN entry in the list, with one selection condition being used with ePDG and PLMN selection for emergency calls and the second selection condition being used with ePDG and PLMN selection for non-emergency services. An encoding of the selection condition in Table 1, when configured in the list, may use 2 bits for emergency calls and another 2 bits for non-emergency services. The selection condition for emergency calls that is included in the list for any PLMN entry may be the same as or different to the selection condition that is included for this PLMN entry for non-emergency services. The prioritized list of PLMN entries may then contain entries like those exemplified in Table 2. Here, the number of PLMNs exemplified in the list shown in Table 2 is N, the FQDN entries shown in Table 2 are optional (and may or may not be included), and each emergency call selection condition (e.g. emergency call selection condition 1) and each non-emergency selection condition (e.g. non-emergency selection condition 1) in Table 2 may be independently configured to any of selection conditions C1, C2, C3 or C4 in Table 1 (or possibly any of selection conditions C5-C9 in Table 1A).

TABLE 2

| PLMN | Information Configured for the PLMN |
| --- | --- |
| PLMN 1 | MCC-1, MNC-1 |
|  | FQDN 1 |
|  | Emergency Call Selection Condition 1 |
|  | Non-Emergency Selection Condition 1 |
| PLMN 2 | MCC-2, MNC-2 |
|  | FQDN 2 |

TABLE 2-continued

| PLMN | Information Configured for the PLMN |
| --- | --- |
|  | Emergency Call Selection Condition 2 |
|  | Non-Emergency Selection Condition 2 |

TABLE 2-continued

| PLMN | Information Configured for the PLMN |
| --- | --- |
| . . . | . . . |
| PLMNs 3 to N-1 | Information for PLMNs 3 to N-1 (e.g. similar to that for PLMN 1, 2 and N) |
| . . . | . . . |
| PLMN N | MCC-1, MNC-N |
|  | FQDN N |
|  | Emergency Call Selection Condition N |
|  | Non-Emergency Selection Condition N |

When the UE 110-*a* encounters an untrusted WLAN 215 and needs to or decides to attach to a PLMN via the WLAN 215, the UE 110-*a* may proceed down the prioritized list of PLMNs that are configured in the UE 110-*a* and may select the first PLMN in the list, and any ePDG configured for this PLMN in the list, for which the given selection condition (e.g., C1, C2 or C3 in Table 1) is satisfied. In the case of determining a country in which the UE 110-*a* is located, a UE 110-*a* may make use of any MCCs visible or recently visible via nearby cellular broadcast (e.g., from a currently accessed or previously accessed VPLMN 204 or from some other visible PLMN) and/or may use a geographic location or recent geographic location (e.g., determined using the global positioning system (GPS)) and convert this to a country using pre-configured data. The UE 110-*a* may start PLMN selection by examining the first PLMN entry in the prioritized list of PLMNs—e.g. by examining the entry for PLMN 1 in the example list of Table 2. If the selection condition for the first PLMN entry in the list is not met (e.g. emergency call selection condition 1 in the case of PLMN and ePDG selection for an emergency call or non-emergency selection condition 1 in the case of PLMN and ePDG selection for non-emergency services), the UE 110-*a* may continue to the second PLMN entry in the list (e.g. PLMN 2 in the example in Table 2). Then, if the selection condition for the second PLMN entry is also not met (e.g. emergency call selection condition 2 in the case of PLMN and ePDG selection for an emergency call or non-emergency selection condition 2 in the case of PLMN and ePDG selection for non-emergency services), the UE 110-*a* may continue to the third PLMN entry in the list and so on. Some PLMNs (e.g., the HPLMN 202) may be included in the list more than once but with different selection conditions for each entry in the list for this PLMN. For example, the HPLMN 202 could be included as the first PLMN entry in the list (e.g. as PLMN 1 in Table 2) with condition C1 or condition C2 for non-emergency services and with condition C1 or condition C2 for emergency calls and also included as the final PLMN entry in the list with condition C3 for non-emergency services and condition C3 for emergency calls, based on using the redirection capability described later herein to enable selection of a more suitable PLMN subsequent to accessing the HPLMN 202. Alternatively, selection of the HPLMN 202 as a last default list entry and possibly as a first list entry, with one of the above conditions, could be supported by a UE 110-*a* without explicitly including the HPLMN 202 in the prioritized list.

The selection conditions C1, C2, C3 and C4 in Table 1 may be configured or assigned as follows in a UE 110-*a* (e.g. by an HPLMN operator) in the case of selection of a PLMN and ePDG for an emergency call. Selection condition C1 may be assigned to a PLMN entry when the PLMN is known (e.g., by the HPLMN 202 operator) to support emergency calls with untrusted WLAN access for any UE 110-*a* located within the cellular coverage area of the PLMN. This may ensure that an emergency call can be routed by the PLMN to a local PSAP. Selection condition C2 may be assigned when a PLMN is known to support both (i) emergency calls with untrusted WLAN access for a UE 110-*a* located anywhere in the home country of the PLMN even when a UE 110-*a* is outside the cellular coverage area of the PLMN and (ii) routing of an emergency call to a correct local PSAP. Selection condition C3 may be assigned as a default condition in the case that other PLMN entries in the list are not applicable or the country the UE 110-*a* is in is unknown. In some embodiments, condition C3 may only be assigned for a PLMN entry for the HPLMN 202.

Condition C3 may sometimes cause an incorrect PLMN to be selected for an emergency call (e.g., the HPLMN 202 when the UE 110-*a* is roaming in another country) but may be useful if the selected PLMN is able to provide the identity of a correct PLMN and/or an associated ePDG to the UE 110-*a* using a redirection capability when the UE 110-*a* attempts an emergency call. Such a redirection capability may be supported by enhancing the session initiation protocol (SIP) 380redirection response to include an ID (e.g., a MCC and/or MNC ID) of a different PLMN and/or the address (e.g., FQDN or IP address) of an ePDG associated with this PLMN. The SIP 380 response may be returned to the UE 110-*a* by a proxy call session control function (P-CSCF), an emergency call session control function (E-CSCF), and/or a location retrieval function (LRF) in the originally selected PLMN in response to a SIP INVITE for an emergency call sent by the UE 110-*a* to the originally selected PLMN. In addition, the PLMN ID and/or ePDG address returned to UE 110-*a* by the originally selected PLMN may be determined by the originally selected PLMN (e.g., by the P-CSCF, E-CSCF, or LRF in the originally selected PLMN that returns the SIP 380 response) using location related information included by UE 110-*a* in the SIP INVITE such as (i) a WLAN access point (AP) ID (e.g., a MAC address) for a visible or serving WLAN AP, (ii) the global cell ID of either a cell visible to the UE 110-*a* or a serving cell for the UE 110-*a* and/or (iii) a geodetic location (e.g. obtained by UE 110-*a* using GPS). In an aspect, an originally selected PLMN may also redirect a UE 110-*a* to a different ePDG for the same (originally selected) PLMN— e.g. an ePDG that is closer to the UE 110-*a*, has more bandwidth or capacity, is less congested or specifically supports emergency calls. Finally, selection condition C4 may be assigned to a PLMN entry in the prioritized list when the PLMN is known (e.g. by the HPLMN 202 operator) not to support, or not to reliably support, emergency calls using untrusted WLAN access.

The selection conditions C1, C2, C3 and C4 in Table 1 may be assigned as follows for a UE 110-*a* (e.g. by the HPLMN 202 operator) in the case of selection of a PLMN and ePDG for non-emergency services. Condition C1 may be assigned to a PLMN when it is preferred (e.g., by the HPLMN 202 operator) that the UE 110-*a* is able to attach to the PLMN via cellular access as well as via a WLAN, thereby enabling handover of voice calls and data sessions for the UE 110-*a* between WLAN access and cellular access for this PLMN which may avoid failure of calls and data sessions when the UE 110-*a* leaves WLAN (or cellular) coverage. In an exemplary embodiment, condition C2 may be assigned when a PLMN is known to provide country-wide cellular coverage—thus enabling the UE 110-*a* to receive cellular access and perform handovers from WLAN access to cellular access, and possibly from cellular access to WLAN access, at a later time even if cellular coverage from the PLMN is not initially visible to the UE 110-*a*. Condition C2 may also be assigned to a PLMN that does not provide country-wide cellular coverage but where the HPLMN 202 operator and/or the UE 110-*a* subscriber may benefit from lower tariffs and/or better service using WLAN access to this PLMN. In an exemplary embodiment, condition C3 may be assigned to provide access to UE 110-*a* to the HPLMN 202 even when UE 110-*a* is roaming in another country and as a default selection when other PLMN entries in the list are not applicable or when the country in which a UE 110-*a* is located is unknown. Finally, Condition C4 may be assigned to a PLMN entry in the prioritized list when the PLMN should not be accessed by a UE 110-*a* for non-emergency services.

As an example of the above technique, assume an HPLMN P1 does not provide complete cellular coverage in the home country and uses a PLMN P2 as a preferred roaming partner that has complete country-wide cellular coverage for UEs 110-*a* roaming in the home country. Also assume that for some other country CY, there is a preferred roaming partner who operates a PLMN P3 that does not have complete cellular coverage in country CY and there is another roaming partner who operates a PLMN P4 who does have complete cellular coverage in country CY. Further assume that all PLMNs except P3 support emergency calls via untrusted WLAN S2b access. The PLMNs could be included in a prioritized list as illustrated below in Table 3 with the indicated selection conditions for emergency calls and non-emergency services.

TABLE 3

| PLMN | Emergency Call Selection Condition | Non-Emergency Selection Condition |
|---|---|---|
| P1 | C1 | C1, C2 or C3 |
| P2 | C2 | C2 (if not C2 or C3 for P1) |
| P3 | C4 | C1 or C2 |
| P4 | C2 | C2 (if not C2 for P3 and not C3 for P1) |

Assume Table 3 is used by a UE 110-*a* to select a PLMN and an associated ePDG for untrusted WLAN access when the UE 110-*a* is at one of the following locations: L1 in cellular coverage of HPLMN P1; L2 in the home country out of cellular coverage of HPLMN P1; L3 in country CY in cellular coverage of PLMN P3; and L4 in country CY out of cellular coverage of PLMN P3. When the UE 110-*a* is at location L1, PLMN P1 may be selected according to the above table for both an emergency call and other non-emergency services. When the UE 110-*a* is at location L2, PLMN P2 may be selected according to the above table for an emergency call and either PLMN P1 or P2 may be selected (depending on the P1 condition) for other non-emergency services. At location L3, PLMN P4 may be selected for an emergency call and either PLMN P3 or P1 (depending on the P1 condition) for other non-emergency services. At location L4, PLMN P4 may be selected for an emergency call and one of PLMNs P4, P3 or P1 (depending on the P1 and P3 conditions) for all other non-emergency services. These selections may overcome the deficiencies described earlier for conventional ePDG selection.

The techniques described above in association with Tables 1-3 may be used in a more generic form by providing the UE 110-*a* (e.g. via configuration information in a USIM for the UE 110-*a*) with a prioritized list of PLMNs containing the following information for each PLMN included in the prioritized list: 1) PLMN ID (e.g. MCC and MNC), 2) Selection Condition(s), and 3) ePDG FQDN rule(s).

The selection condition(s) may indicate the condition or conditions under which a particular PLMN should be selected from the prioritized list by the UE 110-*a* and to which the UE 110-*a* would then attempt to attach via an untrusted WLAN. The ePDG FQDN rule(s) may indicate how the FQDN for an ePDG for the selected PLMN should be constructed by the UE 110-*a* in order to support the attachment of UE 110-*a*. Examples of different selection conditions are the selection conditions C1-C4 described in Table 1 and C5-C9 described in Table 1A. Examples of different FQDN rules include the rules R1-R4 that are described in Table 4.

TABLE 4

| FQDN rule | Description of FQDN Rule |
|---|---|
| R1 | Construct an FQDN for the selected PLMN from the MCC and MNC for the selected PLMN included in the prioritized list (e.g. using an operator identifier FQDN or according to the rules in 3GPP TS 23.003). |
| R2 | Use an FQDN that is explicitly provided as part of the information for the selected PLMN in the prioritized list. |
| R3 | Extend an FQDN (e.g. as constructed using FQDN rule R1 or rule R2) by succeeding or preceding the FQDN with a location area code (LAC) or tracking area code (TAC) for the selected PLMN. The LAC or TAC may correspond to the particular LAC or TAC for the selected PLMN that is either visible to a UE 110-a (e.g. via broadcast from a nearby cell in the selected PLMN) or that forms part of the global cell ID for the serving cell for the UE 110-a when the UE 110-a is already attached to the selected PLMN. This rule may be used to provide a location based FQDN. |
| R4 | Extend an FQDN (e.g. as constructed using FQDN rule R1, R2 and/or R3) by including an indication of an emergency call in the FQDN when the UE 110-a needs to attach to the selected PLMN (via an untrusted WLAN) to establish an emergency call. The indication may comprise adding a defined character sequence to the beginning, end or somewhere in the middle of the FQDN. |

Default selection conditions and FQDN rules may also be defined that may be used by a UE 110-*a* (i) in addition to any selection conditions and FQDN rules included in the PLMN list and/or (ii) when no selection conditions and ePDG FQDN rules, respectively, are included for a particular PLMN entry in the PLMN list. For example, a default selection condition (e.g. in the absence of other selection conditions) could be condition C1 in Table 1. A default FQDN rule (e.g. in the absence of other FQDN rules) could be FQDN rule R1 in Table 4. A default FQDN rule (e.g. in addition to other FQDN rules in Table 4) could be FQDN rule R4 in Table 4 in the case that a prioritized list of PLMNs is used only to select a PLMN and an associated ePDG to support an emergency call from a UE 110-*a* via an untrusted WLAN. Default selection conditions and default FQDN rules may also be referred to as implicit selection conditions and implicit FQDN rules, respectively, and may be used in some embodiments by a UE 110-*a* to select a PLMN and associated ePDG when some or all PLMN entries in a PLMN list do not contain any selection conditions and/or FQDN rules. Thus, in these embodiments, a PLMN list may contain PLMN entries that each comprise an identity for the PLMN (e.g. MCC and MNC IDs) but no explicit selection conditions and/or no explicit FQDN rules and where any selection conditions and/or FQDN rules for each PLMN entry may be common to all PLMN entries and defined implicitly.

A prioritized list of PLMNs may then be implemented (e.g. configured in the USIM of a UE 110-*a*) as shown in Table 5 for an example in which there are just four PLMN entries.

TABLE 5

| PLMN | PLMN ID | Selection Conditions | FQDN Rules |
|---|---|---|---|
| PLMN1 | MCC1, MNC1 | SC1, SC2 | FR1, FR2 |
| PLMN2 | MCC2, MNC2 | SC3 | FR3 |
| PLMN3 | MCC3, MNC3 | SC4, SC5 | FR4 |
| PLMN4 | MCC4, MNC4 | SC6 | FR5, FR6 |

The PLMN column in Table 5 illustrates an example name or other designation for each PLMN in the list and is included for clarity of description, though may not be needed in an implementation. The PLMN ID may include the MCC and MNC IDs for the PLMN for each table entry. The selection conditions may contain zero, one or more selection conditions for selecting a PLMN entry in the list when a UE 110-*a* needs to select a PLMN for untrusted WLAN access. The FQDN rules may define how a UE 110-*a* may select and/or construct an FQDN that may be used by the UE 110-*a* to access an ePDG for a PLMN in the list when this PLMN is selected (e.g. with the UE 110-*a* using a DNS query for the FQDN to obtain the IP address for the ePDG). Although the example in Table 5 uses different labels for the selection conditions (e.g., SC1, SC2, SC3, SC4, SC5, SC6) and FQDN rules (e.g. FR1, FR2, FR3, FR4, FR5, FR6), some or all of these selection conditions and FQDN rules may be the same. For example, selection conditions SC1 and SC3 could be the same selection condition or could be different selection conditions. Similarly, FQDN rules FR2 and FR4 could be the same FQDN rule or different FQDN rules.

When a UE 110-*a* needs to access a PLMN via an untrusted WLAN, the UE 110-*a* may sequentially proceed through a prioritized list of PLMNs, one PLMN entry at a time, until a PLMN entry is found whose selection conditions allow the PLMN to be selected by the UE 110-*a*. The UE 110-*a* may then obtain or construct an FQDN for the selected PLMN using the FQDN rules for the selected PLMN in the prioritized list. Any default selection conditions and/or default FQDN rules may also be used by the UE 110-*a* in this process.

In the example shown in Table 5, a UE 110-*a* may first evaluate PLMN1 by deciding whether to select PLMN1 using the selection conditions SC1 and SC2 in this example for PLMN1. If PLMN1 is selected, the UE 110-*a* may next obtain or construct an FQDN using the FQDN rules FR1 and FR2 in this example for PLMN1. The UE 110-*a* may use the obtained or constructed FQDN to perform a DNS query. The IP address returned by the DNS query may then be used by UE 110-*a* to access an ePDG for PLMN1 (e.g. ePDG 240 in the case that PLMN1 corresponds to VPLMN 204 in FIG. 2) and perform network attachment to PLMN1 as defined by 3GPP in 3GPP TS 23.402 for WLAN access via an S2b interface. If PLMN1 is not selected, the UE 110-*a* may next evaluate the next PLMN in the list which happens to be PLMN2 in this example. The UE 110-*a* can perform the same type of selection decision for PLMN2 as previously described for PLMN1, except in this example using the selection condition SC3 in this example instead of SC1 and SC2. If PLMN2 is selected, the UE 110-*a* may obtain or construct an FQDN as described for PLMN1 but now using FQDN rule FR3 in this example instead of FR1 and FR2. The FQDN thereby obtained or constructed may be used in the same way for PLMN2 as described for PLMN1. If PLMN2 is not selected, the UE 110-*a* may proceed to evaluate the table entry for PLMN3 as described for PLMN1 and PLNM2. If PLMN3 is not selected and there happen to be other PLMNs in the table such as PLMN4 in this example, the process may be repeated for each one of these PLMNs in turn until one PLMN is selected or the end of the table is reached. In the latter case, there may be a default final selection not listed in the table such as selecting the HPLMN 202 for the UE 110-*a* and using an ePDG FQDN for the HPLMN 202 created from the MCC and MNC for the HPLMN 202 or configured for the HPLMN 202. The default final selection may be associated with a particular PLMN (e.g. the HPLMN 202) and may have one or more default selection conditions and default FQDN rules.

Examples of the selection conditions SC1-SC6 in Table 5 may be any of the selection conditions C1-C4 in Table 1 and C5-C9 in Table 1A. Examples of the FQDN rules FR1-FR6 in Table 5 may be any of the FQDN rules R1-R4 in Table 4.

In an example embodiment of FQDN rule R1 in Table 4 according to existing 3GPP rules in 3GPP TS 23.003, to access a selected ePDG, the UE 110-*a* may construct a fully qualified domain name (FQDN) using, for example, a home public land mobile network identification (HPLMN ID) or a visited public land mobile network identification (VPLMN ID) as the operator identifier. The ePDG FQDN may contain an operator identifier consisting of MCC and MNC IDs that uniquely identifies the PLMN where the ePDG is located. For example, the ePDG FQDN may be composed of seven labels. The last three labels may be "pub.3gppnetwork.org". The third and fourth labels together may uniquely identify the PLMN using the MCC and MNC IDs. The first two labels may be "epdg.epc". The result of the ePDG FQDN may be:

"epdg.epc.mnc<MNC>.mcc<MCC>.pub.3gppnetwork.org"

Here the "<MCC>" that is included in the FQDN may be the 3 digit mobile country code (MCC) of the PLMN while the "<MNC>" may be the 2 or 3 digit mobile network code (MNC) of the PLMN. In the case of a 2 digit MNC code an extra zero ("0") digit may be prepended to the 2 digit MNC code to provide 3 digits. As an example, the ePDG FQDN Operator Identifier for MCC 345 and MNC 12 may be coded as "epdg.epc.mnc012.mcc345.pub.3gppnetwork.org".

In an exemplary embodiment, some or all of the PLMN selection conditions (e.g., such as C1, C2, C3 and C4 in Table 1 and C5-C9 in Table 1A) and/or the FQDN rules (e.g., such as R1, R2, R3 and R4 in Table 4) may not appear as part of either a prioritized list of PLMNs (such as exemplified in Table 5) or a non-prioritized list of PLMNs. For example, a prioritized list (or possibly a non-prioritized list) LS of PLMNs that is configured in a UE 110-*a* (e.g., on a universal integrated circuit card (UICC) or on a USIM for the UE 110-*a*) may have just one PLMN selection condition SC and/or just one FQDN rule FR. In the case of one PLMN selection condition SC, a UE 110-*a* that has access to an untrusted WLAN, and is attempting to select a PLMN and ePDG to obtain S2b EPC access to the PLMN from the untrusted WLAN, may first attempt to select a PLMN using one or more other PLMN lists and/or other selection conditions. If a PLMN is not selected (e.g., no PLMN fits the required selection conditions) or if there are no other PLMN lists and/or no other selection conditions that a UE 110-*a* needs to make use of prior to using the list LS, the UE 110-*a* may then use the list LS and attempt to select a PLMN in the list LS according to the one selection condition SC. For example, the selection condition SC may be implicit or a default as described previously.

By way of example, the list LS may comprise a list of PLMN IDs, each comprising an MCC and MNC, and the one selection condition SC may correspond to the condition C2 in Table 1. In that case if the UE 110-*a* is able to determine the country the UE 110-*a* is in (e.g., via the global positioning system (GPS) or by observing a global cell ID broadcast from a nearby cell that includes an MCC ID), the UE 110-*a* may first determine one or more PLMN MCC IDs corresponding to the determined country. The UE 110-*a* may then look through the list LS and search for a PLMN in the list LS (e.g. starting with the PLMN that appears earliest in the list LS if LS is prioritized or starting with any PLMN in the list LS if LS is not prioritized) that has an MCC ID that is the same as any of the MCC IDs determined by the UE 110-*a* for the country in which the UE 110-*a* is located. If the UE 110-*a* finds such a PLMN, the UE 110-*a* may then select the PLMN and proceed to obtain or construct an ePDG FQDN for this PLMN—e.g. using one default FQDN rule FR or several default FQDN rules such as any of R1-R4 in Table 4 or using an FQDN rule or rules included as part of the entry in table LS for the selected PLMN.

Selection of a PLMN (e.g. the VPLMN 204 or HPLMN 202 in the case of the wireless communications system architecture 200 of FIG. 2) and obtaining or constructing an FQDN for an associated ePDG (e.g. the ePDG 240 in FIG. 2) by a UE 110-*a* in order to obtain access to the core network (e.g. EPC) of the selected PLMN by UE 110-*a* and obtain communications services, such as establishing an emergency call to the PSAP 160 of FIG. 1, may use the techniques described previously in association with Tables 1-5. In that case, one prioritized (or non-prioritized) list of PLMNs or more than one prioritized (or non-prioritized) list of PLMNs may be configured by the operator of the HPLMN 202 in the UE 110*a* (e.g. in a UICC or USIM for the UE 110-*a*) to support the techniques described previously in association with Tables 1-5. Each configured list of PLMNs, or all configured lists of PLMNs, may be referred to, as mentioned previously, as "ePDG selection information". In some embodiments, there may be (A) ePDG selection information (e.g. a prioritized list) to select a PLMN and associated ePDG for an emergency call from a UE 110-*a* and (B) separate ePDG selection information (e.g. a separate prioritized list) to select a PLMN and associated ePDG for non-emergency services from a UE 110-*a*. Table 5 provides an example of (A) and an example of (B). In some other embodiments, there may be one set of ePDG selection information (e.g. one prioritized list) that enables a UE 110-*a* to select a PLMN and associated ePDG for either an emergency call or non-emergency services. Tables 2 and 3 described previously provide examples of this. Nevertheless, the examples in Tables 2 and 3 can also be examples of the separate lists in (A) and (B) if some information is removed from these tables (e.g. FQDN information and/or conditions or selection conditions for either emergency calls or non-emergency services). Similarly, Table 5 can exemplify a single set of ePDG selection information or a single prioritized (or non-prioritized) list for both emergency calls and non-emergency services if additional selection conditions and FQDN rules are added for each PLMN entry for either emergency calls or non-emergency services.

There are other embodiments that make use of a prioritized list or ePDG selection information that may enable a UE 110-*a* to select a PLMN and an associated ePDG to support an emergency call from a UE 110-*a* that has access to an untrusted WLAN (e.g. an untrusted WiFi AP). These are referred to in the following description as a first and second example embodiment for convenient reference.

In a first example embodiment and in a first step, the UE 110-*a* may determine the country in which it is located—e.g. using GPS or some other Global Navigation Satellite System (GNSS) such as Galileo, Glonass or Beidou or by using location and/or country related information broadcast by a WLAN that UE 110-*a* has access to. If the UE 110-*a* determines that it is located in its home country, then in a second step of the first example embodiment, the UE 110-*a* may select an ePDG in the HPLMN 202. If the ePDG selection information configured in the UE 110-*a* contains the HPLMN 202, the UE 110-*a* may construct an FQDN using the MCC and MNCs IDs for the HPLMN 202 as discussed previously. If the ePDG selection information does not contain the HPLMN 202 and the UE 110-*a* is configured with an ePDG identifier that contains the FQDN or IP address of an ePDG in the HPLMN 202, then the UE 110-*a* may use the configured FQDN and use a DNS server function to obtain the IP address(es) of the ePDG(s) in the HPLMN 202 from a DNS query for the FQDN. Alternatively, the UE 110-*a* may use a configured IP address for the HPLMN 202. Otherwise, the UE 110-*a* may construct an Operator Identifier FQDN from the MCC and MNC IDs for the HPLMN 202 and use a DNS server function to obtain the IP address(es) of the ePDG(s) in the HPLMN 202 from a DNS query for the constructed FQDN.

If the UE 110-*a* determines that an ePDG in the HPLMN 202 may not be selected (e.g. due to failure of a DNS query for an FQDN), then in a third step of the first example embodiment, the UE 110-*a* may stop the ePDG selection.

If the UE 110-*a* determines to be located in a country other than its home country (called the visited country) and the UE 110-*a* is attached or registered via a 3GPP defined access type such as LTE, WCDMA or GSM to a VPLMN 204 and the VPLMN 204 matches a PLMN entry in the ePDG selection information for the UE 110-*a*, then in a fourth step of the first example embodiment, the UE 110-*a* may select an ePDG in the VPLMN 204. For example, the UE 110-*a* may construct an FQDN for the VPLMN 204 using the MCC and MNC IDs for the VPLMN 204 and perform a DNS query with the constructed FQDN to obtain an IP address for an ePDG 240 in the VPLMN 204. For the fourth step, the selection condition for each PLMN entry in the ePDG selection information may be that the UE 110-*a* is attached or registered via a 3GPP defined access type to the PLMN, but this selection condition may be implicit or a default (e.g. as described previously) and not explicitly appear in the ePDG selection information for any PLMN entry.

In all other cases, (e.g. when the UE 110-*a* is not configured with the ePDG selection information, or the UE 110-*a* is attached or registered via a 3GPP access type to a PLMN but this PLMN does not match an entry in the ePDG selection information, or the UE 110-*a* is not attached or registered via a 3GPP access type to any PLMN), the UE 110-*a* may select an ePDG by performing a "DNS country procedure", as discussed later herein with respect to the second example embodiment.

In a second example embodiment, the UE 110-*a* (e.g. a UICC or USIM for the UE 110-*a*) may be configured by the HPLMN 202 operator with an ePDG address that supports emergency bearer services for the HPLMN 202. The ePDG address may take the format of an FQDN or an IP address, for example. The ePDG configuration information and ePDG selection information in UE 110-*a* that is used for emergency calls may be separate from the ePDG configuration information and ePDG selection information in UE 110-*a* that is used for non-emergency services.

In the second example embodiment, the UE 110-*a* may construct an Operator Identifier FQDN for a selected PLMN (such as the HPLMN 202 or VPLMN 204) from the MCC and MNC IDs for this PLMN as described previously, but with the addition that the FQDN constructed may also contain an indication that the UE 110-*a* requires an ePDG that supports an emergency call. The construction of an Operator Identifier FQDN may be according to an implicit or default FQDN rule as described previously. The UE 110-*a* may then use a DNS server function to obtain the IP address(es) of the ePDG(s) by issuing a DNS query for the constructed FQDN. If the DNS query fails or does not provide an IP address, the UE 110-*a* may stop the establishment of the emergency call. The UE 110-*a* may perform PLMN and ePDG selection for an emergency call according to the second example embodiment using the following steps.

In a first step of the second example embodiment, the UE 110-*a* may determine the country it is located in—e.g. using GPS or GNSS. If the country is the home country for the UE 110-*a*, then in a second step of the second example embodiment, the UE 110-*a* may select the HPLMN 202 and select an ePDG for the HPLMN 202 either from an FQDN or IP address configured in the UE 110-*a* for the HPLMN 202 as described previously, or by constructing an FQDN for the ePDG from the MCC and MNC IDs for the HPLMN 202, as described previously.

In a third step for the second example embodiment, if the country that is determined is not the home country for the UE 110-*a*, and if the UE 110-*a* is configured with ePDG selection information that includes an entry for a PLMN-x in this country that indicates support for emergency calls over WLAN by PLMN-x, and if the UE 110-*a* is attached via a 3GPP access type to the PLMN-x, then the UE 110-*a* may attempt to select an ePDG in this PLMN-x. For the third step, one selection condition (consistent with the third step) for some but not necessarily all PLMN entries in the ePDG selection information may be that the UE 110-*a* is in the same country as the PLMN and is attached via a 3GPP access type to this PLMN, where it is implied that a PLMN with this selection condition supports emergency calls from a UE with access to an untrusted WLAN.

In a fourth step for the second example embodiment, if the UE 110-*a* is not attached via a 3GPP access type to any PLMN or if the UE 110-*a* is unable to select a PLMN or an ePDG according to the first, second or third steps, and if the ePDG selection information includes entries for one or more PLMNs in the country determined in step one that indicate support for emergency calls over WLAN for the entire country, then the UE 110-*a* may select one of these PLMNs and an ePDG in this PLMN by constructing a corresponding Operator Identifier FQDN for the ePDG using the MCC and MNC IDs for the selected PLMN. In an aspect, the UE 110-*a* may consider the PLMNs based on their priorities in the ePDG selection information. For example, the UE 110-*a* may select the PLMN with the highest priority for the country the UE 110-*a* is located in that is indicated (by the entry for this PLMN in the ePDG selection information) as supporting emergency calls over WLAN for the entire country. For the fourth step, one selection condition for some but not necessarily all PLMN entries in the ePDG selection information (consistent with the fourth step) may be that the UE 110-*a* is in the same country as the PLMN, where it may be implied that the PLMN supports emergency calls via untrusted WLAN access over the entire country for the PLMN.

In an alternative aspect of step four for the second example embodiment, the indication of "support for emergency calls over WLAN for the entire country" in the ePDG selection information may be replaced by a different indication. Examples of the different indication can include "support for emergency calls over WLAN", "support for emergency calls with preference over other PLMNs" and "support for emergency calls over WLAN within the licensed coverage area of the PLMN". With this alternative aspect, when performing step four of the second example embodiment, if the UE 110-*a* is unable to select a PLMN or an ePDG according to the first, second or third steps, and if the ePDG selection information includes entries for one or more PLMNs in the country determined in step one that comprise the different indication, then the UE 110-*a* may select one of these PLMNs and an ePDG in this PLMN by constructing a corresponding Operator Identifier FQDN for the ePDG using the MCC and MNC IDs for the selected PLMN. In a further aspect, the UE 110-*a* may consider the PLMNs based on their priorities in the ePDG selection information. With the alternative aspect, it is possible that a PLMN initially selected by the UE 110-*a* (e.g. VPLMN 204) may not support an emergency call over a WLAN from the UE 110-*a* at the location of the UE 110-*a*. In that case, the initially selected PLMN may use the redirect capability described previously to redirect UE 110-*a* to a different PLMN and ePDG that may support the emergency call over WLAN. Alternatively, the UE 110-*a* may select a different PLMN and ePDG by repeating the alternative aspect of step 4 in which the initially selected PLMN is excluded from selection.

In a fifth step of the second example embodiment, if the UE 110-*a* is unable to select a PLMN or an ePDG according to the first, second, third or fourth steps, the UE 110-*a* may perform a "DNS country procedure" to select a PLMN and ePDG. In the DNS country procedure, the UE 110-*a* constructs an FQDN containing an identifier for the country in which the UE 110-*a* is located as determined in step one (e.g. an FQDN comprising a mobile country code (MCC) for this country) and performs a DNS query using this FQDN to obtain a list of PLMNs in this country that support emergency calls over WLAN. If the DNS response contains one or more PLMNs, then the UE 110-*a* may select one of the PLMNs and construct an Operator Identifier FQDN for an ePDG in this PLMN using the MCC and MNC IDs for this PLMN.

In an aspect of step five, the UE 110-*a* may give priority to any PLMN returned in the DNS response that is included in ePDG selection information for the UE 110-*a* with higher priority than other PLMNs returned in the DNS response.

In a sixth step of the second example embodiment, if the UE 110-*a* cannot determine the country in which it is located in step one or if PLMN or ePDG selection according to the first, second, third, fourth and fifth steps of the second example embodiment do not apply or fail, the UE 110-*a* may stop PLMN and ePDG selection for an emergency call over WLAN.

Variants of the first and second example embodiments described previously are also possible in which the ordering of steps is different, certain steps are combined or divided, steps are removed and/or new steps are added.

It is noted that ePDG selection information, which may comprise one or more PLMN lists containing PLMN entries and possibly selection conditions and/or FQDN rules for some or all PLMN entries, may be configured by a PLMN operator in a UE 110-*a*—e.g. on a UICC or USIM for the UE 110-*a* as described previously. However, in some embodiments, some or all ePDG selection information may be provided to a UE 110-*a* by an HPLMN (e.g. HPLMN 202), a VPLMN (e.g. VPLMN 204) or by a WLAN (e.g., WLAN 215)—e.g. may be provided when the UE 110-*a* registers with, attaches to or associates with the HPLMN, VPLMN or WLAN. Such provision may be useful when a UE 110-*a* roams into a country different to the home country to enable UE 110-*a* to support emergency calls and non-emergency services via untrusted WLAN access without the HPLMN operator of UE 110-*a* needing to configure the ePDG selection information in advance, which may be useful if the HPLMN operator does not possess all of the ePDG selection information.

The present disclosure is thus able to support emergency calls and/or non-emergency services over an untrusted WLAN in any country and to enable preferential access by a UE 110-*a* to any preferred PLMN when roaming, even when the PLMN does not provide cellular access at the current UE 110-*a* location.

Figure 3:
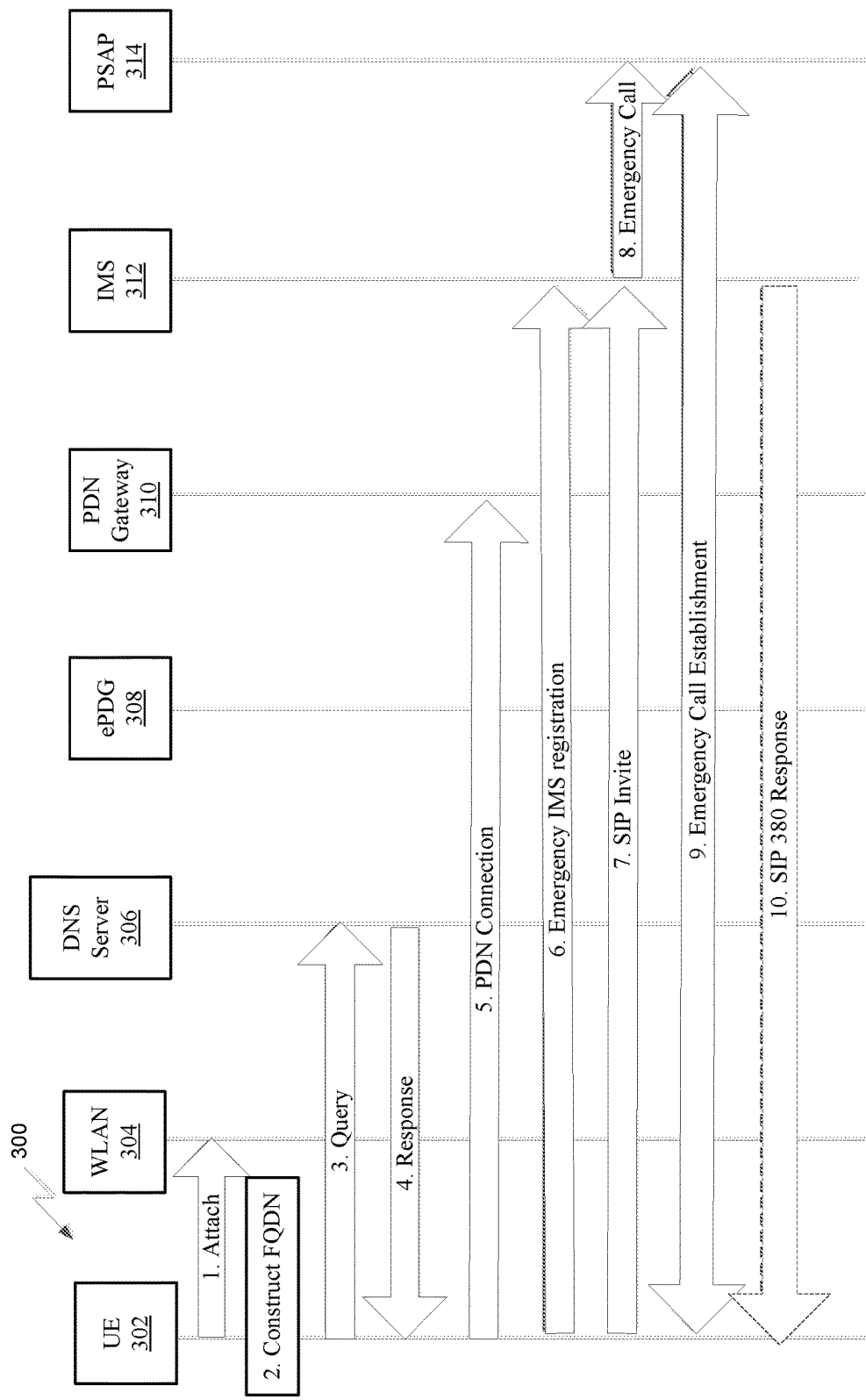
FIG. 3 is a signaling flow diagram illustrating PLMN and ePDG selection.

FIG. 3 is a message flow 300 illustrating an example of PLMN and ePDG selection for an emergency call from a UE 302 with access to an untrusted WLAN. Although message flow 300 illustrates PLMN and ePDG selection for an emergency call, a message flow similar to or the same as message flow 300 may be applicable to and/or illustrate PLMN and ePDG selection for other communication services such as a non-emergency call. The PLMN and ePDG selection flow shown in FIG. 3 may begin when an emergency call is dialed by a user of the UE 302 (not shown in FIG. 3). In FIG. 3: UE 302 may correspond to UE 110 in FIG. 1 and/or to UE 110-*a* in FIG. 2; WLAN 304 may correspond to access point 115 and/or WLAN 125 in FIG. 1 and/or to untrusted WLAN 215 in FIG. 2; DNS Server 306 may be accessed via WLAN 304 and/or via PDN Gateway 310; ePDG 308 may correspond to ePDG 130 in FIG. 1 and/or to ePDG 240 in FIG. 2; PDN Gateway 310 may correspond to PDN Gateway 170 in FIG. 1 and/or to PDN Gateway 235 in FIG. 2; IMS 312 may correspond to IMS 190 in FIG. 1, visited network IP services or proxies 270 in FIG. 2 and/or home network IP services 203-*a* in FIG. 2; and PSAP 314 may correspond to central service/PSAP 160 in FIG. 1.

At step 1 in message flow 300 (e.g. following the dialing of an emergency call by the user of UE 302), the UE 302 attaches to and establishes an association with an untrusted WLAN 304—e.g. using procedures defined for WiFi access in IEEE 802.11 standards. In some embodiments, step 1 may occur prior to the dialing of an emergency call by the user of UE 302—e.g. if the user of UE 302 needs to access WLAN 304 for non-emergency services prior to dialing an emergency call.

At step 2 in message flow 300, the UE 302 selects a PLMN (e.g. an HPLMN 202 or VPLMN 204) and obtains or constructs an FQDN for an ePDG 308 using any of the techniques described previously herein for enabling selection of a PLMN and ePDG for an emergency call over an untrusted WLAN. For example, an HPLMN operator for UE 302 may configure ePDG selection information containing a prioritized list of PLMN identities in the form of MCC and/or MNC codes in the UE 302 (e.g., in a universal subscriber identity module (USIM) card for the UE 302), where each PLMN identity is associated with a PLMN entry in the list. For each PLMN entry in the list, an FQDN of an ePDG may be configured that belongs to the PLMN and may be accessed by the UE 302 to attach to the PLMN. In addition, the list can include one or more FQDN rules for constructing an FQDN for a selected PLMN. If an FQDN is not configured for any PLMN in the list, a UE 302 may assume by default that the FQDN may be constructed using the MCC and/or MNC for the PLMN included in the list. In addition, for each PLMN entry in the list, one or more selection conditions may be configured for emergency calls and optionally one or more similar but separate selection conditions may be configured for other non-emergency services. The UE 302 may use this configured ePDG selection information to select a PLMN and determine an FQDN for an ePDG 308 for this PLMN as described previously.

At step 3 in message flow 300, the UE 302 performs a Domain Name Server (DNS) query using the FQDN for the ePDG 308 obtained or constructed at step 2 by sending a DNS query containing this FQDN to a DNS server 306. At step 4 in message flow 300, the DNS server 306 returns an IP address (or possibly more than one IP address) to the UE 302 corresponding to this FQDN.

At step 5 in message flow 300, the UE 302 may attach to the PLMN selected at step 2 (e.g. attach to the EPC of the PLMN) via the ePDG 308 whose IP address was obtained at step 4. In attaching to the PLMN, the UE 302 may be authenticated by the PLMN. The UE 302 may also or instead be authenticated by the HPLMN for the UE 302 (e.g. if the selected PLMN is not the HPLMN). The UE 302 may obtain a Packet Data Network (PDN) connection to a PDN Gateway 310 in the selected PLMN along with an IP address (e.g. assigned to the UE 302 by the PDN Gateway 310) to enable IP access to other entities beyond the PDN Gateway 310 (e.g. to support subsequent steps 6-10). The UE 302 may indicate to the selected ePDG 308 that the attachment at step 5 is for an emergency call—e.g. to ensure that the attachment receives treatment appropriate to an emergency call such as receiving a PDN Gateway 310 in the selected PLMN and not in the HPLMN if the UE 302 is roaming.

At step 6 in message flow 300, the UE 302 may perform emergency IP multimedia subsystem (IMS) registration with the IMS 312 in the selected PLMN, and with an IMS in the HPLMN (not shown in FIG. 3) if the UE 302 is roaming. The emergency registration may be performed by exchanging SIP signaling messages between the UE 302, the IMS 312 in the selected PLMN, and the IMS in the HPLMN if the UE is roaming, using the PDN connection established at step 5.

At step 7 in message flow 300, the UE 302 may send a SIP INVITE message to the IMS 312 in the selected PLMN requesting an emergency call.

At step 8 in message flow 300, the IMS 312 may forward the emergency call to a PSAP 314 that supports emergency calls at the location of the UE 302.

At step 9 in message flow 300, an emergency call may be established between the UE 302 and the PSAP 314—e.g. via the exchange of more SIP signaling messages.

In a variant of the message flow 300, instead of forwarding the emergency call to a PSAP 314 at step 8 and performing emergency call establishment at step 9, the IMS 312 in the selected PLMN (e.g. a P-CSCF, E-CSCF or LRF in the IMS 312) may invoke the redirection capability described previously to redirect the UE 302 to a different PLMN and/or different ePDG. This may occur if the IMS 312 in the selected PLMN discovers that the UE 302 is at a location (e.g. in a country or region of a country) at which emergency calls are not supported by the selected PLMN for untrusted WLAN access or for other reasons. The location of the UE 302, or information from which this location can be obtained, may be provided to the IMS 312 by the UE 302 in the SIP INVITE sent at step 7 and may comprise a geodetic location (e.g. latitude and longitude coordinates) obtained by the UE 302 using GPS, GNSS or from information broadcast by the WLAN 304, and/or may comprise a global cell ID for a visible or recently visible network cell or a WiFi MAC address for the WLAN 304. Alternatively, the location of the UE 302 may be obtained by IMS 312 by positioning the UE 302—e.g. using the SUPL location solution defined by the Open Mobile Alliance (OMA). Alternatively, the IMS 312 may obtain the location of the UE 302 from information obtained directly or indirectly from the ePDG 308 such as location information related to an IP address assigned to the UE 302 by the WLAN 304. The IMS 312 in the selected PLMN may further know that the UE 302 is using an untrusted WLAN for access to the selected PLMN from information included by the UE 302 in the SIP INVITE sent at step 7, such as a WiFi MAC address for the untrusted WLAN 304. Alternatively, the IMS 312 in the selected PLMN may know that the UE 302 is using an untrusted WLAN for access to the selected PLMN from information obtained directly or indirectly from the ePDG 308 (e.g. obtained from the ePDG 308 via one or more of the PDN Gateway 310 and a vPCRF or hPCRF in the selected PLMN (not shown in FIG. 3)).

Based on not supporting an emergency call from the UE 302 at the location of the UE 302 for untrusted WLAN access, the IMS 312 in the selected PLMN (e.g. a P-CSCF, E-CSCF or LRF in the IMS 312) may return a SIP 380 response to the UE 302 at step 10 in message flow 300 instead of performing steps 8 and 9. The IMS 312 may include in the SIP 380 response an indication of an emergency call, the identity (e.g. MCC and MNC IDs) of a different PLMN than the selected PLMN and/or an FQDN or IP address of a different ePDG 308-A (not shown in FIG. 3) than the ePDG 308 determined at step 2. The different PLMN and/or different ePDG 308-A may be determined by the IMS 312 based on the location of the UE 302 (e.g. obtained by the IMS 312 as previously described) and data configured in the IMS 312 providing preferred or alternative PLMNs and/or FQDNs (or IP addresses) for preferred or alternative ePDGs for different locations of a UE.

If a PLMN ID comprising an MCC and MNC is returned at step 10 in message flow 300 but not an ePDG FQDN or IP address, the UE 302 may construct an operator identifier FQDN for an ePDG for this PLMN from this MCC and MNC as described previously (e.g. using rules defined in 3GPP TS 23.003). If an FQDN is returned at step 10 or if the UE 302 constructs an FQDN from a PLMN ID returned at step 10, the UE 302 may perform steps 3 and 4 in message flow 300 again to obtain the IP address for a different ePDG 308-A (not shown in FIG. 3). The UE 302 may then attach to the different PLMN and/or to the different ePDG 308-A and reattempt the emergency call via this different PLMN and/or different ePDG 308 by repeating steps 5-9 in message flow 300 with any different ePDG 308-A now replacing ePDG 308 in FIG. 3 and any different PLMN (and an IMS and PDN Gateway in this PLMN) replacing the PLMN selected at step 2 (and replacing the IMS 312 and PDN Gateway 310 in this PLMN). This may enable an emergency call to be established when the initially selected PLMN and/or ePDG at step 2 are unsuitable—e.g. if the HPLMN was selected at step 2 when the UE is roaming in another country.

In an embodiment, the 380 response returned at step 10 in message flow 300 may include an indication of an emergency call but may not include the identity of a different PLMN or an FQDN or IP address of a different ePDG. Instead the 380 response may include an indication that the UE 302 should use a different PLMN without specifying the PLMN. In some aspects, this indication of using a different PLMN may be implicit and not part of the SIP 380 response. With this embodiment, UE 302 may repeat step 2 of message flow 300 by selecting a new PLMN (e.g. an HPLMN 202 or VPLMN 204) and obtaining or constructing an FQDN for a different ePDG 308-A for this new PLMN using any of the techniques described previously herein. The repetition of step 2 to select the new PLMN may be the same as step 2 before except that the previously selected PLMN may be removed from the selection process (e.g. with UE 302 not allowed to select this PLMN again). UE 110-a may then repeat steps 3-9 in message flow 300 for the newly selected PLMN and associated ePDG 308-A.

In an embodiment, step 10 in message flow 300 may be performed by the IMS 312 in the selected PLMN (or the IMS in the HPLMN when the selected PLMN is the HPLMN) when the UE 302 instigates a normal call for an emergency number dialed by the user of the UE 302 that is not recognized by the UE 302 as an emergency number and if the IMS 312 in the selected PLMN (or HPLMN) recognizes the dialed number as an emergency number and needs to redirect the UE to a different PLMN and/or different ePDG that may support the emergency call.

Figure 4:
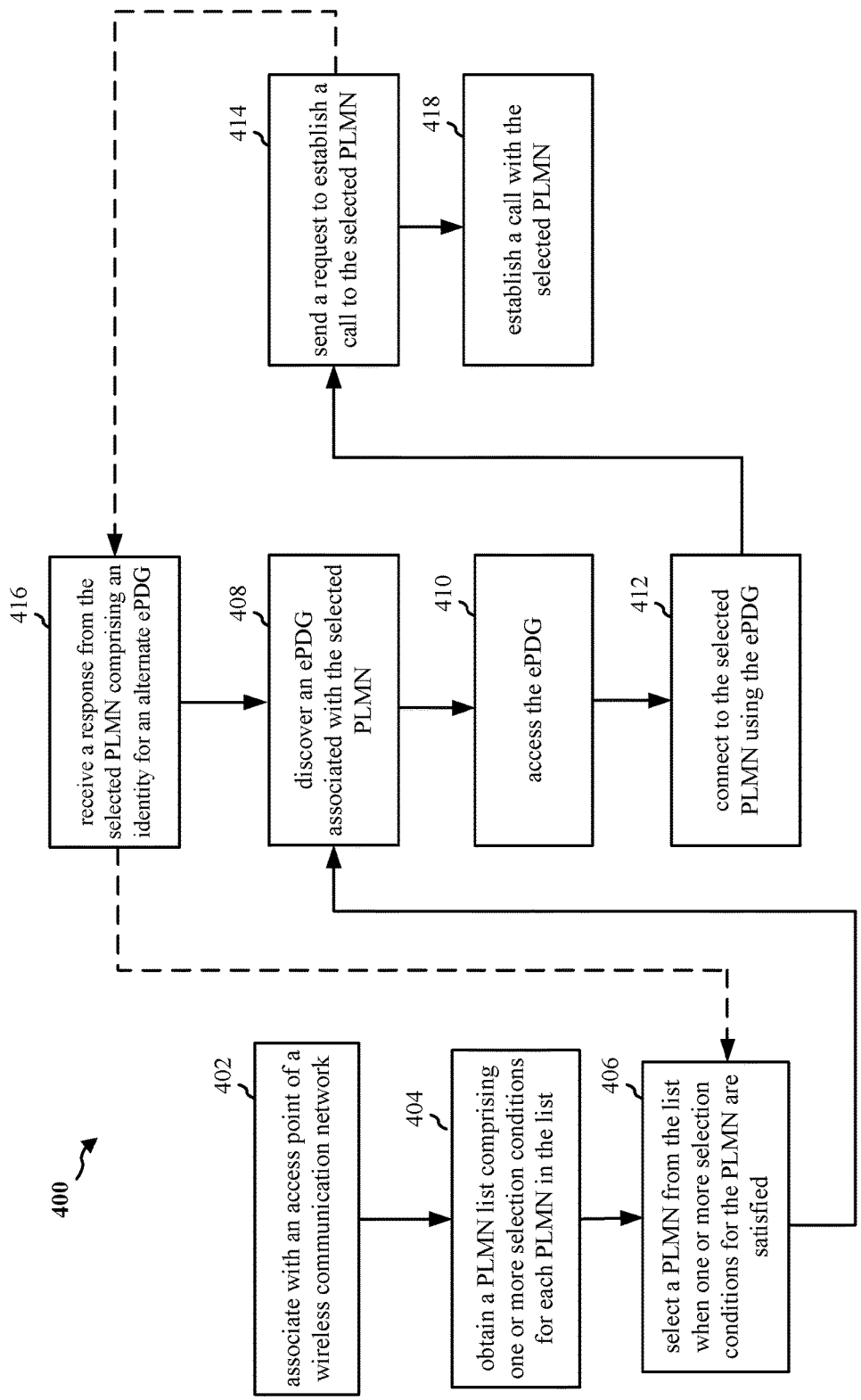
FIG. 4 is a flowchart of a method of selecting and accessing an ePDG using a WLAN.

FIG. 4 is a flowchart showing an exemplary procedure 400 of a method of wireless communication. The method may be performed by a UE (e.g., UE 110, UE 110-a, UE 302).

At step 402, the UE may associate with an access point of a wireless communication network. For example, the UE may associate with an untrusted WiFi access point of an untrusted WLAN. The association may comprise attaching to the untrusted WLAN as at step 1 in message flow 300.

At step 404, the UE may obtain a list, also referred to as a PLMN list, comprising a plurality of PLMN entries and one or more selection conditions associated with each one of the plurality of PLMN entries. The PLMN list may comprise ePDG selection information as described previously herein (e.g. in association with Tables 1-5 and the first and second example embodiments). For example, an HPLMN operator may configure a prioritized list of PLMN identities in the form of MCC and/or MNC codes in the UE (e.g., in a universal subscriber identity module (USIM) or a universal integrated circuit card (UICC) for the UE), where each PLMN identity is associated with a PLMN entry in the list. The one or more selection conditions may be associated with each one of the PLMN entries in the list. In an aspect, the UE may obtain the list of PLMN entries from data configured in the UE. In an aspect, one or more common selection conditions may be associated with all PLMN entries in the PLMN list.

At step 406, the UE may select a PLMN from the list when one or more selection conditions for the PLMN are satisfied. For example, the UE may select the PLMN by sequentially evaluating each one of the multiple PLMN entries in the list (e.g. according to a priority of the PLMNs in the list) using one or more selection conditions for each PLMN until it is determined that one or more selection conditions for a PLMN are met. In an embodiment, the selection conditions may comprise any of the conditions C1-C4 in Table 1 and/or any of the conditions C5-C9 in Table 1A.

At step 408, the UE may discover an ePDG associated with the PLMN selected at step 406. In an aspect, the UE may discover the ePDG by determining an FQDN for the ePDG based on one or more FQDN rules for the selected PLMN, and obtaining an IP address for the ePDG using a DNS query for the FQDN (e.g. as at steps 3 and 4 in message flow 300). The one or more FQDN rules may comprise any of the FQDN rules R1-R4 described previously in Table 4. In another aspect, an entry for the selected PLMN in the PLMN list comprises the FQDN, and one of the one or more FQDN rules for the selected PLMN comprises obtaining the FQDN for the ePDG from the list entry for the PLMN when the PLMN is selected. In a further aspect, an entry for the selected PLMN in the PLMN list comprises an identity for the selected PLMN, and one of the one or more FQDN rules for the selected PLMN comprises constructing the FQDN for the ePDG from the identity for the PLMN when the PLMN is selected. In an aspect, the identity for the selected PLMN comprises one or more of an MCC or an MNC for the selected PLMN and one of the one or more FQDN rules for the selected PLMN comprises constructing the FQDN from the MCC and MNC (e.g. using an operator identifier FQDN as described previously herein and/or according to rules defined in 3GPP TS 23.003). In an aspect, the UE may prepend or append a location area code, routing area code or tracking area code to the FQDN determined for the ePDG, wherein the prepending or appending may be based on one of the one or more FQDN rules for the selected PLMN. In an aspect, the UE may include additional characters in the FQDN indicating an emergency call when the PLMN and ePDG selection is being performed to support an emergency call from the UE. In an aspect, the inclusion of additional characters in the FQDN indicating an emergency call may be based on one of the one or more FQDN rules for the selected PLMN. In an aspect, the one or more FQDN rules is (are) distinct for each PLMN entry in the plurality of PLMN entries. In an aspect, the one or more FQDN rules is (are) common for all PLMN entries in the plurality of PLMN entries.

At step 410, the UE may access the ePDG discovered at step 408 using the access point for the wireless local area network.

At step 412, the UE may connect to the PLMN selected at step 406 using the ePDG discovered at step 408 and obtain a PDN connection to a PDN Gateway in the PLMN (or possibly in the HPLMN for the UE when the PLMN selected at step 406 is not the HPLMN). Steps 410 and 412 may correspond to step 5 in message flow 300.

At step 414, which may be optional and not performed in all embodiments, the UE may send a request (e.g. a SIP INVITE message) to establish a call (e.g. an emergency call or a non-emergency call) to the PLMN to which the UE had connected at step 412. Step 414 may correspond to step 7 in message flow 300 and may be preceded by an emergency IMS registration by the UE in the selected PLMN (not shown in FIG. 4), which may correspond to step 6 in message flow 300.

In one embodiment, following step 414, the UE may receive a response from the selected PLMN at step 416, wherein the response comprises an identity for an alternate ePDG. In this embodiment, the UE may connect to the alternate ePDG using the access point and establish the emergency call or the non-emergency call using the alternate ePDG. In one aspect of this embodiment, the response at step 416 is a SIP 380 response. In one aspect of this embodiment, the identity of the alternate ePDG comprises at least one of an FQDN for the alternate ePDG, an IP address for the alternate ePDG, an identity of an alternate PLMN or an indication, which may explicit or implicit, of using a different PLMN. In this embodiment, the UE may repeat step 406 to select a different PLMN if the alternate ePDG comprises an indication of using a different PLMN. The UE may also repeat steps 408-414 to discover a different ePDG (e.g. if the identity of an alternate PLMN or an indication of using a different PLMN is received at step 416), connect to the discovered different ePDG and with the PLMN associated with the discovered different ePDG and reattempt the call. Step 416 may correspond to step 10 in message flow 300 and the repetition of steps 406-414 or 408-414 may correspond to the repetition of steps 2-7 or 5-7, respectively, as described previously for message flow 300 following step 10 in message flow 300.

At step 418, the UE may establish an emergency or non-emergency call with the selected PLMN or with an alternate PLMN or different PLMN in the case that step 416 has occurred and steps 406-414 or 408-414 were repeated. Step 418 may occur following step 414 when step 416 does not occur, and following a repetition of step 414 when step 416 does occur. In an aspect, the call that is established may be an emergency call or a non-emergency call and may be routed by the selected PLMN (or by the alternate PLMN or different PLMN when step 416 occurs) to an external entity such as a PSAP (e.g. the PSAP 160 in FIG. 1 in the case if an emergency call). Step 418 may correspond to steps 8 and 9 in message flow 300.

Figure 5:
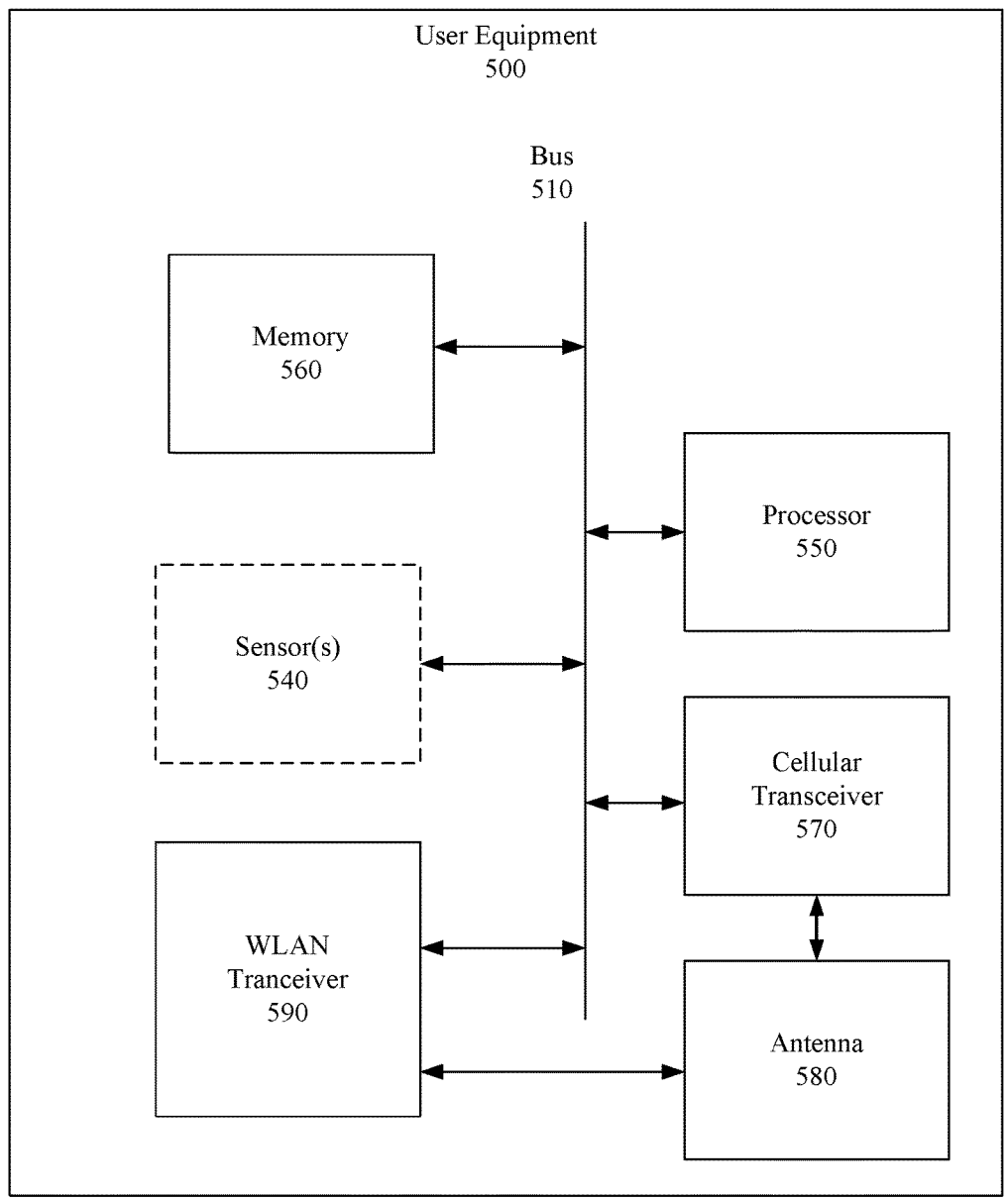
FIG. 5 is an architecture diagram of a user equipment (UE).

In FIG. 5, a UE 500 is exemplified. UE 500 may correspond to or represent one or more of UE 110 in FIG. 1, UE 110-*a* in FIG. 2, UE 302 in FIG. 3 and any UE performing the exemplary procedure 400 of FIG. 4. UE 500 may contain a bus 510, sensor(s) 540 and a processor 550. The bus 510 couples together the various components of the UE 500. The UE 500 may include a memory 560 and a cellular transceiver 570 coupled to the bus 510 (as shown in FIG. 5) and/or to the processor 550 (not shown in FIG. 5). The cellular transceiver 570 may enable the UE 500 to attach to and communicate with a cellular PLMN, such as visited network 102 and/or home network 104 in FIG. 1 and VPLMN 204 and/or HPLMN 202 in FIG. 2, via cellular means (e.g. using LTE or UMTS access). The memory 560 may include an operating system and code to perform embodiments described herein. The cellular transceiver 570 may be coupled to an antenna 580 and may allow the UE 500 to transmit and receive signals to and from various base stations (e.g. base station 105 in FIG. 1 and/or base stations 105-*a* to 105-*n* in FIG. 2). The UE 500 may also contain a WLAN transceiver 590 which may be connected to the same antenna 580 as the cellular transceiver 570 or to a separate antenna (not shown in FIG. 5). The WLAN transceiver 590 may support communication using WiFi signaling (e.g. IEEE 802.11 signaling) and may enable UE 500 to communicate and/or associate with one or more WLAN APs such as the access point 115 and WLAN 125 shown in FIG. 1, the trusted and untrusted WLANs 210 and 215 shown in FIG. 2, and/or the WLAN 304 described for FIG. 3. In some embodiments, the WLAN transceiver 590 and cellular transceiver 570 may be supported by common hardware (e.g. by the same hardware chip). The UE 500 may further include any of components 604, 606, 608, 610, 612, 616, 618, 620, 622 described later for exemplary apparatus 602. In one implementation, these components may be supported as processes, programs, applications and/or sets of firmware or software instructions that are stored in memory 560 and executed on processor 550. Alternatively, these components may be supported by additional hardware, firmware and/or software (e.g. processor(s), memory, program instructions) in UE 500, not explicitly shown in FIG. 5.

Figure 6:
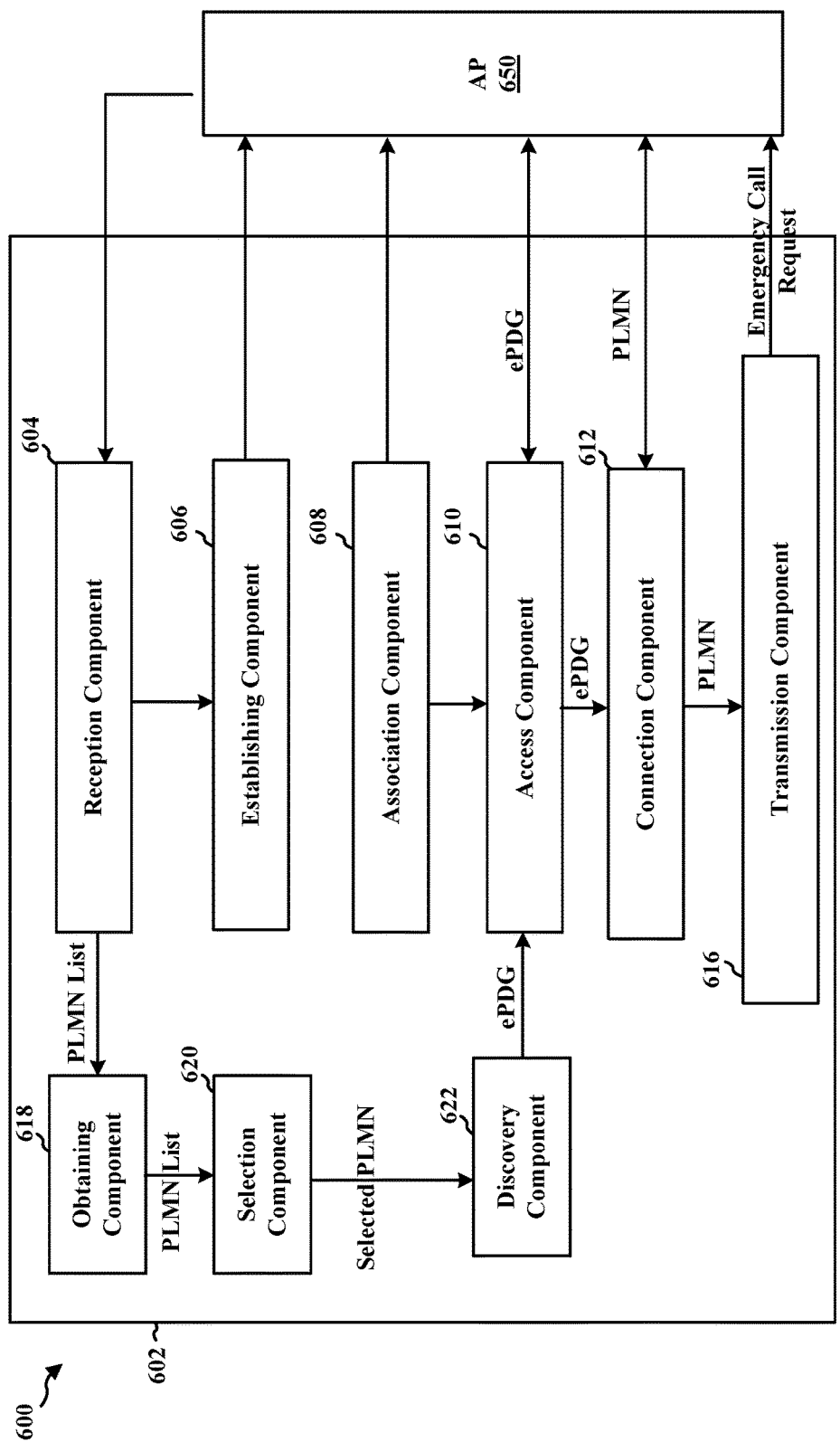
FIG. 6 is a data flow diagram illustrating the data flow between different means/components in a UE.

FIG. 6 is a conceptual data flow diagram 600 illustrating the data flow between different means/components in an exemplary apparatus 602. The apparatus may be a UE, such as UE 110, UE 110-a, UE 302 or a UE implementing the exemplary procedure 400. The apparatus includes a reception component 604 that receives wireless communication from at least one WLAN AP 650 and a transmission component 616 that transmits wireless communication to AP 650. The apparatus 602 may include an association component 608 that associates with at least one AP 650 of a wireless network (e.g. as at step 402 for exemplary procedure 400). For example, AP 650 may be an access point of an untrusted WLAN.

The apparatus 602 may include an obtaining component 618 that obtains a PLMN list comprising one or more selection conditions (e.g. as at step 404 for exemplary procedure 400). For example, an HPLMN operator may configure a prioritized list of PLMN identities in the form of MCC and/or MNC codes in the UE (e.g., in a universal subscriber identity module (USIM) card for the UE), where each PLMN identity is associated with a PLMN entry in the list. The PLMN list may be obtained from reception component 604 and/or from data configured in the apparatus.

The apparatus 602 may include a selection component 620 that receives the PLMN list from the obtaining component and selects a PLMN from the list when the one or more selection conditions for the PLMN are satisfied, e.g., as described for step 406 for exemplary procedure 400. The selection component may provide the selected PLMN to a discovery component 622 that discovers an ePDG associated with the selected PLMN, such as described for step 408 of exemplary procedure 400.

The apparatus may include an access component 610 that accesses the discovered ePDG using the access point 650 for a wireless local area network (e.g. as at step 410 for exemplary procedure 400). The discovery component 622 may provide the discovered ePDG to the access component 610. The apparatus may include a connection component 612 that receives the ePDG information from the access component 610 and connects to the selected PLMN using the ePDG and obtains a PDN connection to a PDN Gateway in the selected PLMN (e.g. as at step 412 for exemplary procedure 400). The connection may be performed, e.g., via transmission component 616.

The apparatus 602 may further comprise an establishing component 606 that establishes a call with the selected PLMN (e.g. as at steps 414 and 418 for exemplary procedure 400).

The apparatus 602 (e.g. the reception component 604) may at times receive a response from the selected PLMN, wherein the response comprises an identity for an alternate ePDG (e.g. as at step 416 for exemplary procedure 400). In this example, one or more of the selection component 620, the discovery component 622, access component 610 and connection component 612 may discover an alternate ePDG, access the alternate ePDG and connect to an alternate PLMN for the alternate ePDG using the AP 650 (e.g. as for a repetition of steps 406-412 or 408-412 following step 416 for exemplary procedure 400).

The apparatus 602 may include additional components that perform each of the steps of message flow 300 of FIG. 3 and exemplary procedure 400 of FIG. 4 in ways different to that described for components 604-622. Each step in the aforementioned message flow 300 and exemplary procedure 400 may be performed by such an additional component and the apparatus 602 may include one or more of those components. The components may be one or more hardware components specifically configured to carry out the stated processes, implemented by a processor configured to perform the stated processes, stored within a computer-readable medium for implementation by a processor, or some combination thereof.

It is understood that the specific order or hierarchy of blocks and/or steps in the processes/flowcharts disclosed is an illustration of exemplary approaches. Based upon design preferences, it is understood that the specific order or hierarchy of blocks and/or steps in the processes/flowcharts may be rearranged. Further, some blocks and/or steps may be combined or omitted. The accompanying method claims present elements of the various blocks and/or steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
   associating with an access point of a wireless local area network (WLAN);
   obtaining a list comprising a plurality of public land mobile network (PLMN) entries and one or more selection conditions;

selecting a PLMN from the list when the one or more selection conditions are satisfied; and discovering an evolved packet data gateway (ePDG) associated with the selected PLMN, wherein the discovering the ePDG comprises:

determining a fully qualified domain name (FQDN) for the ePDG based at least in part on an FQDN rule for the selected PLMN; and obtaining an Internet Protocol (IP) address for the ePDG using a domain name server (DNS) query for the FQDN.

2. The method of claim 1, wherein the one or more selection conditions comprise at least one member selected from the group consisting of:

the UE being already attached to the PLMN by a Third Generation Partnership Project (3GPP) access type;

the PLMN being visible at a cellular level to the UE and the UE not being attached to any other PLMN;

the UE being located in the same country as the PLMN;

the PLMN being a default wildcard PLMN; and the PLMN not being available for selection.

3. The method of claim 1, wherein the selecting the PLMN comprises sequentially evaluating each one of the plurality of PLMN entries in the list using the one or more selection conditions until it is determined that the one or more selection conditions are met.

4. The method of claim 1, further comprising:

accessing the ePDG using the WLAN access point; and connecting to the selected PLMN using the ePDG.

5. The method of claim 1, wherein:

an entry in the list for the selected PLMN comprises the FQDN; and the FQDN rule comprises obtaining the FQDN for the ePDG from the entry in the list when the PLMN is selected.

6. The method of claim 1, wherein:

an entry in the list for the selected PLMN comprises an identity for the selected PLMN; and the FQDN rule comprises constructing the FQDN for the ePDG from the identity for the selected PLMN.

7. The method of claim 6, wherein the identity for the selected PLMN comprises a Mobile Country Code (MCC) or a Mobile Network Code (MNC) or a combination thereof.

8. The method of claim 1, wherein an entry in the list for the selected PLMN comprises the FQDN rule.

9. The method of claim 1, further comprising:

prepending or appending a location area code, routing area code or tracking area code to the FQDN determined for the ePDG, wherein the prepending or appending is based at least in part on the FQDN rule.

10. The method of claim 1, wherein the FQDN rule is distinct for each PLMN entry in the plurality of PLMN entries.

11. The method of claim 1, wherein the FQDN rule is common for all PLMN entries in the plurality of PLMN entries.

12. The method of claim 4, further comprising sending a request to establish a call to the selected PLMN;

receiving a response from the selected PLMN, wherein the response comprises an identity for an alternate ePDG;

connecting to the alternate ePDG using the WLAN access point; and establishing the call using the alternate ePDG.

13. The method of claim 12, wherein the response is a Session Initiation Protocol (SIP) 380 response.

14. The method of claim 12, wherein the identity of the alternate ePDG comprises at least one member selected from the group consisting of:

an FQDN;

an IP address;

an identity of an alternate PLMN; and an indication of using a different PLMN.

15. The method of claim 1, wherein the WLAN is an untrusted WLAN.

16. The method of claim 1, wherein the obtaining the list of PLMN entries comprises obtaining the list from data configured in the UE.

17. A user equipment (UE) for wireless communication, comprising:

means for associating with an access point of a wireless local area network (WLAN);

means for obtaining a list comprising a plurality of public land mobile network (PLMN) entries and one or more selection conditions;

means for selecting a PLMN from the list when the one or more selection conditions are satisfied; and means for discovering an evolved packet data gateway (ePDG) associated with the selected PLMN; wherein the means for discovering the ePDG is configured to:

determine a fully qualified domain name (FQDN) for the ePDG based at least in part on an FQDN rule for the selected PLMN; and obtain an Internet Protocol (IP) address for the ePDG using a domain name server (DNS) query for the FQDN.

18. The UE of claim 17, wherein the one or more selection conditions comprise at least one member selected from the group consisting of:

the UE being already attached to the PLMN by a Third Generation Partnership Project (3GPP) access type;

the PLMN being visible at a cellular level to the UE and the UE not being attached to any other PLMN;

the UE being located in the same country as the PLMN;

the PLMN being a default wildcard PLMN; and the PLMN not being available for selection.

19. The UE of claim 17, wherein the means for selecting the PLMN is configured to sequentially evaluate each one of the plurality of PLMN entries in the list using the one or more selection conditions until it is determined that the one or more selection conditions are met.

20. The UE of claim 17, further comprising:

means for accessing the ePDG using the WLAN access point; and means for connecting to the selected PLMN using the ePDG.

21. The UE of claim 17, wherein the means for discovering the ePDG are configured to prepend or append a location area code, routing area code or tracking area code to the FQDN determined for the ePDG, wherein the prepending or appending is based at least in part on the FQDN rule.

22. The UE of claim 20, wherein the means for connecting to the selected PLMN are configured to send a request to establish a call to the selected PLMN and receive a response from the selected PLMN, wherein the response comprises an identity for an alternate ePDG, and wherein the means for accessing the ePDG are configured to connect to the alternate ePDG using the WLAN access point and establish the call using the alternate ePDG.

23. The UE of claim 22, wherein the identity of the alternate ePDG comprises at least one member selected from the group consisting of:
an FQDN;
an IP address;
an identity of an alternate PLMN; and
an indication of using a different PLMN.

24. The UE of claim 17, wherein means for the obtaining the list of PLMN entries comprises obtaining the list from data configured in the UE.

25. A user equipment (UE) for wireless communication, comprising:
memory;
at least one processor coupled to the memory and configured to:
associate with an access point of a wireless local area network (WLAN);
obtain a list comprising a plurality of public land mobile network (PLMN) entries and one or more selection conditions;
select a PLMN from the list when the one or more selection conditions are satisfied; and
discover an evolved packet data gateway (ePDG) associated with the selected PLMN, wherein the discovering the ePDG comprises:
determining a fully qualified domain name (FQDN) for the ePDG based at least in part on an FQDN rule for the selected PLMN; and
obtaining an Internet Protocol (IP) address for the ePDG using a domain name server (DNS) query for the FQDN.

26. The UE of claim 25, wherein the one or more selection conditions comprise at least one member selected from the group consisting of:
the UE being already attached to the PLMN by a Third Generation Partnership Project (3GPP) access type;
the PLMN being visible at a cellular level to the UE and the UE not being attached to any other PLMN;
the UE being located in the same country as the PLMN;
the PLMN being a default wildcard PLMN; and
the PLMN not being available for selection.

27. The UE of claim 25, wherein the selecting the PLMN comprises sequentially evaluating each one of the plurality of PLMN entries in the list using the one or more selection conditions until it is determined that the one or more selection conditions are met.

28. The UE of claim 25, wherein the at least one processor is further configured to:
access the ePDG using the WLAN access point; and
connect to the selected PLMN using the ePDG.

29. The UE of claim 25, wherein:
an entry in the list for the selected PLMN comprises the FQDN; and
the FQDN rule comprises obtaining the FQDN for the ePDG from the entry in the list when the PLMN is selected.

30. The UE of claim 25, wherein:
an entry in the list for the selected PLMN comprises an identity for the selected PLMN; and
the FQDN rule comprises constructing the FQDN for the ePDG from the identity for the selected PLMN.

31. The UE of claim 30, wherein the identity for the selected PLMN comprises one or more of a Mobile Country Code (MCC) or a Mobile Network Code (MNC).

32. The UE of claim 25, wherein an entry in the list for the selected PLMN comprises the FQDN rule.

33. The UE of claim 25, wherein the at least one processor is further configured to:
prepend or append a location area code, routing area code or tracking area code to the FQDN determined for the ePDG, wherein the prepending or appending is based at least in part on the FQDN rule.

34. The UE of claim 25, wherein the FQDN rule is distinct for each PLMN entry in the plurality of PLMN entries.

35. The UE of claim 25, wherein the FQDN rule is common for all PLMN entries in the plurality of PLMN entries.

36. The UE of claim 28, wherein the at least one processor is further configured to:
send a request to establish a call to the selected PLMN;
receive a response from the selected PLMN, wherein the response comprises an identity for an alternate ePDG;
connect to the alternate ePDG using the WLAN access point; and
establish the call using the alternate ePDG.

37. The UE of claim 36, wherein the response is a Session Initiation Protocol (SIP) 380 response.

38. The UE of claim 36, wherein the identity of the alternate ePDG comprises at least one member selected from the group consisting of:
an FQDN;
an IP address;
an identity of an alternate PLMN; and
an indication of using a different PLMN.

39. The UE of claim 25, wherein the WLAN is an untrusted WLAN.

40. The UE of claim 25, wherein the obtaining the list of PLMN entries comprises obtaining the list from data configured in the UE.

41. A non-transitory computer-readable medium storing computer executable code for wireless communication for a user equipment (UE), comprising code when executed by one or more processors cause the UE to:
associate with an access point of a wireless local area network (WLAN);
obtain a list comprising a plurality of public land mobile network (PLMN) entries and one or more selection condition;
select a PLMN from the list when the one or more selection conditions are satisfied; and
discover an evolved packet data gateway (ePDG) associated with the selected PLMN, wherein the discovering the ePDG comprises:
determining a fully qualified domain name (FQDN) for the ePDG based at least in part on an FQDN rule; and
obtaining an Internet Protocol (IP) address for the ePDG using a domain name server (DNS) query for the FQDN.

42. The computer-readable medium of claim 41, wherein the one or more selection conditions comprise at least one member selected from the group consisting of:
the UE being already attached to the PLMN by a Third Generation Partnership Project (3GPP) access type;
the PLMN being visible at a cellular level to the UE and the UE not being attached to any other PLMN;
the UE being located in the same country as the PLMN;
the PLMN being a default wildcard PLMN; and
the PLMN not being available for selection.

43. The computer-readable medium of claim 41, wherein the selecting the PLMN comprises sequentially evaluating each one of the plurality of PLMN entries in the list using the one or more selection conditions until it is determined that the one or more selection conditions are met.

44. The computer-readable medium of claim 41, further comprising code to:
   access the ePDG using the WLAN access point; and
   connect to the PLMN using the ePDG.

45. The computer-readable medium of claim 41, further comprising code to:
   prepend or append a location area code, routing area code or tracking area code to the FQDN determined for the ePDG, wherein the prepending or appending is based at least in part on the FQDN rule.

46. The computer-readable medium of claim 44, further comprising code to:
   send a request to establish a call to the selected PLMN;
   receive a response from the selected PLMN, wherein the response comprises an identity for an alternate ePDG;
   connect to the alternate ePDG using the WLAN access point; and
   establish the call using the alternate ePDG.

47. The computer-readable medium of claim 41, wherein the obtaining the list of PLMN entries comprises obtaining the list from data configured in the UE.

\* \* \* \* \*